US008086759B2

(12) United States Patent
Brown et al.

(10) Patent No.: US 8,086,759 B2
(45) Date of Patent: Dec. 27, 2011

(54) CONTROLLER HAVING REDUCED CONTROL KEY SET AND METHOD FOR OPERATING SAME IN A LEARNING, MACRO, OR CLONING MODE

(75) Inventors: Paul Anson Brown, Sunnyvale, CA (US); Aaron Daniel Thieme, San Francisco, CA (US)

(73) Assignee: SP Controls, Inc., South San Francisco, CA (US)

( * ) Notice: Subject to any disclaimer, the term of this patent is extended or adjusted under 35 U.S.C. 154(b) by 131 days.

(21) Appl. No.: 12/417,084

(22) Filed: Apr. 2, 2009

(65) Prior Publication Data

US 2009/0195406 A1 Aug. 6, 2009

Related U.S. Application Data

(60) Division of application No. 11/146,393, filed on Jun. 6, 2005, now Pat. No. 7,515,062, and a continuation-in-part of application No. 10/859,851, filed on Jun. 3, 2004, now Pat. No. 7,334,067.

(51) Int. Cl.
*G06F 3/00* (2006.01)

(52) U.S. Cl. ........................... 710/2; 200/5 R; 200/52 R

(58) Field of Classification Search ........................ None
See application file for complete search history.

(56) References Cited

U.S. PATENT DOCUMENTS

| | | | | |
|---|---|---|---|---|
| 4,532,395 | A * | 7/1985 | Zukowski | 200/314 |
| 5,859,623 | A | 1/1999 | Meyn et al. | 715/730 |
| 5,915,285 | A * | 6/1999 | Sommer | 73/865.7 |
| 6,064,668 | A | 5/2000 | Brown | 370/357 |
| 6,137,794 | A | 10/2000 | Brown | 370/360 |
| 6,140,987 | A | 10/2000 | Stein et al. | 345/87 |
| 2004/0163936 | A1 | 8/2004 | Clegg et al. | 200/5 A |
| 2004/0174288 | A1 | 9/2004 | Park | 341/176 |
| 2008/0114414 | A1 * | 5/2008 | Moore et al. | 607/46 |

OTHER PUBLICATIONS

Xantech Corporation, "Installation Instructions for Smartpad$_3$ Programmable Keypad System," Feb. 29, 2000 (downloaded from www.xantech.com/products/i_folder/i_smrtp3.pdf on Mar. 25, 2004), pp. 1-28.

Xantech Corporation, "MRC44 Four Zone—Four Source Audio/Video Controller/Amplifier System," 2002, 6 pages.

(Continued)

*Primary Examiner* — Eron J Sorrell
(74) *Attorney, Agent, or Firm* — Girard & Equitz LLP

(57) ABSTRACT

In some embodiments, a wall-mountable, configurable controller having control keys (e.g., less than eight keys or another small number of keys), a subassembly including circuitry, and a control key insert removably mountable to the subassembly and including at least one of the control keys. The circuitry can include a limit switch that is biased in a default state but moveable into a learning state in response to user-exerted force. In some embodiments, the controller includes an IR emitter and an IR receiver and is operable to clone another device by sending configuring radiation from the emitter to the other device's IR receiver. Preferably, the emitter and receiver are positioned so that a controller's IR emitter aligns with the IR receiver of an identical controller when the controllers are positioned face to face. In some embodiments, the controller provides audible and visual feedback to users when operating in a learning mode.

2 Claims, 8 Drawing Sheets

OTHER PUBLICATIONS

Niles Audio Corporation, "IntelliPad Wall Mounted Programmable IR Keypad System," 1999 (downloaded from www.nilesaudio.com/pdffiles/manuals/intellipad.pdf on Mar. 25, 2004, 31 pages.

Parts Express Product Catalog, including description of "NuVo™ Keypad Controller," 2004, front cover and p. 6.

SP Controls, Inc., "SP3-TCM+ Transport Control Module," Feb. 24, 2004, 23 pages.

Crestron, "Crestron C2N-DB6/8/12 Decorator Wall Panels Operations & Installation Guide," downloaded from www.crestron.com/downloads/pdf/product_manuals/c2n-db6_c2n-db8_c2n-db12.pdf on Mar. 24, 2004, 5 pages.

Crestron, "Crestron CNWM-LT9 LiteTouch Keypad Operations & Installation Guide," downloaded from www.creston.com/downloads/pdf/product_manuals/cnwm-lt9.pdf on Mar. 24, 2004, 12 pages.

Extron Electronics, "Control Modules—User's Manual", 2002, 15 pages.

Speakercraft, "The Book . . . Solutions for Custom Installers," Jun. 2004, front and back cover, pp. 66-69 and pp. 71-72.

Extron Electronics, "Quick Start Guide-MLC 52 MediaLink™ Controller," 16 pages, Oct. 2005.

Extron Electronics, "User's Manual-MLC 52 IR MLC 52 RS MediaLink™ Controllers," 114 pages, Aug. 2005.

Extron Electronics, "MLC 52 Series," (downloaded from http://www.extron.com/download/files/brochure/mlc52series_05ebro.pdf on Jun. 8, 2005), four pages.

Extron Electronics, "Extron Introduces New MLC 52 IR and MLC 52 RS MediaLink™ Controllers," Jun. 8, 2005 (downloaded from http://www.extron.com/company/archive.asp?id=mlc52series_pr&version=print on Jun. 8, 2005), one page.

Extron Electronics, "MLC 52 IR Basic MediaLink™ Controller with IR Control," (downloaded from http://www.extron.com/product/product.asp?id=mic52ir&version=print on Jun. 8, 2005), five pages.

Extron Electronics, "MLC 52 RS Basic MediaLink™ Controller with IR and RS-232 Control," (downloaded from http://www.extron.com/product/product.asp?id=mlc52rs&version=print on Jun. 8, 2005), six pages.

iAutomate.com, "*Channel Plus MCS-1 Room Stereo Controller*", 2 pages, downloaded from the Internet on Jul. 28, 2005, from http://www.iautomate.com/mcs1.html.

iAutomate.com, "*Channel Plus MCS-2 Room Stereo Controller*", 2 pages, downloaded from the Internet on Jul. 28, 2005, from http://www.iautomate.com/mcs2.html.

Multiplex Technology, Inc., "*ChannelPlus Models MCS-1 and MCS-2 Single and Double Gang Music Controllers*", Aug. 30, 2001, 1 page, downloaded from the Internet (from http://www.firecontrolinc.com/downloads/mcs1-2_spec.pdf).

Multiplex Technology, Inc., "*ChannelPlus MDS-6 Installation Manual", 15 pages, downloaded from the Internet on Jul. 28, 2005, from http://www.firecontrolinc.com/downloads/mds6*_manual.pdf.

Multiplex Technology, Inc., "*ChannelPlus MDS-6 Owner's Manual*", 6 pages, downloaded from the Internet on Jul. 28, 2005, from http://www.firecontrolinc.com/downloads/mds6_manual.pdf.

* cited by examiner

CONTROLLER HAVING REDUCED CONTROL KEY SET AND METHOD FOR OPERATING SAME IN A LEARNING, MACRO, OR CLONING MODE

CROSS-REFERENCE TO RELATED APPLICATION

This application is a division of U.S. patent application Ser. No. 11/146,393, entitled CONTROLLER HAVING REDUCED CONTROL KEY SET AND METHOD FOR OPERATING SAME IN A LEARNING, MACRO, OR CLONING MODE, filed Jun. 6, 2005 (to issue as U.S. Pat. No. 7,515,062), and a continuation in part of U.S. patent application Ser. No. 10/859,851, entitled PROGRAMMABLE CONTROLLER HAVING REDUCED CONTROL KEY SET, filed on Jun. 3, 2004 (issued as U.S. Pat. No. 7,334,067).

FIELD OF THE INVENTION

The invention pertains to a configurable apparatus for controlling a projector or other device (e.g., an audio, video, or audiovisual device) and to methods for operating such an apparatus in a learning and/or cloning mode. In some embodiments, the invention is a wall-mountable projector controller having a first key set, a second key set, a third key set and configurable switches actuatable by pressing control keys in the key sets. Each key set includes at least one control key (or zero or at least one control key) but no more than a small number of control keys, and the key sets are in distinct regions of the controller's surface. Each configurable switch actuatable by pressing a key of the first key set is configured only to perform control operations of a first type (e.g., power control operations), each switch actuatable by pressing a key of the second key set is configured only to perform control operations of another type (e.g., source selection control operations), and each switch actuatable by pressing a key of the third key set is configured only to perform control operations of another type (e.g., volume control operations).

BACKGROUND OF THE INVENTION

The expression "controller" is used herein to denote a device configured to generate control signals for controlling a remotely located device (a "target"). Typically, the controller and target are connected by a wire pair or electrically conductive cable which terminates at an infrared (IR) emitter positioned near the target (or, in some cases, by a cable including an optical fiber or bundle of optical fibers), and the control signals propagate from the controller to the target (or to an IR emitter positioned near the target) over the wire pair or cable. For example, electrical control signals propagate over a wire pair from the controller to an IR emitter positioned near the target and IR control signals generated in the IR emitter in response to the electrical control signals propagate to the target. Alternatively, the controller and target are not connected by any wire pair or cable, and the control signals are transmitted (typically as electromagnetic radiation) from controller to target.

The expression "wall-mounted" device herein denotes a device that is mounted to a wall (e.g., mounted in an electrical box affixed to a wall) or other object that is fixed during use of the device (e.g., a podium) and is designed to remain so mounted when in use. The expression "wall-mountable" device herein denotes a device that can be mounted to a wall or other object (e.g., a podium) that is to remain fixed during use of the device, and is designed to remain so mounted when in use.

The expressions "configurable device" and "learning device" are used herein as synonyms to denote a device capable of being configured to emulate a second device (e.g., to be capable of controlling a target in the same manner that the second device controls the target), solely or principally in response to data asserted to the device from the second device. Many embodiments of the inventive controller are learning devices because they are capable of learning to replicate control signals asserted thereto by a remote control, in response to an IR control stream received from the remote control.

The expression that a device is a "programmable" device is used herein to denote that the device is capable of emulating a second device only after it has been given a set of instructions, written or sometimes via a graphical representation, by an operator or installer. The expression that a device is a "programmable" device is used in the parent application to denote either that the device is a "learning" device (in the sense defined in the previous paragraph) or a that the device is a "programmable" device (in the sense defined in this paragraph).

The ability of a device to "learn" is marketable and has implications for the process of specifying, configuring, installing the device. "Learning" differentiates a product as requiring much less domain expertise than an otherwise equivalent "programmable" device. An end-user with no programming experience can "configure" or "teach" a learning device, but a highly-skilled programmer is typically required to program a programmable device.

The expression to "configure a control key" of a controller (and variations on this expression) are used herein to denote configuring the controller to perform at least one control operation in response to actuation of the control key.

Many types of handheld and wall-mounted controllers have been employed to control projectors, audio and video devices, and other devices. Typically, controllers have a large number of control keys (which are often quite small) and thus require that the user devote significant effort and attention to operating them. Some conventional controllers can be programmed, configured, or taught (e.g., are operable in a learning mode in which they can be configured or taught) to execute specific operations in response to user actuation of specific ones of their keys. However, a user must devote significant effort and attention to operating a conventional configurable controller of the type having a large number of keys from which the user must select.

Controllers having a small number of keys (e.g., less than eight keys) can be operated with less effort and attention from a user than controllers having more keys, since the user can more easily identify (and remember the location of) a desired key that belongs to a small set of keys than a desired key that belongs to a large set of keys. It is also desirable to reduce the number of control keys of a controller to reduce manufacturing cost.

However, a user must also devote significant effort and attention to operating conventional, wall-mounted, configurable controllers that have a small number of control keys. This is true for the following reasons. On such a controller, the key for executing any specific operation can be located anywhere. Since the controller's face is not partitioned into regions allocated to control functions of specific, predetermined types, the user must learn (e.g., by inspecting a label) the control operation that each key has been configured to execute. Typically, the keys of a conventional, wall-mounted, configurable controller are labeled after the controller is configured to indicate to the user the control operation associated with each configured key. Even with the keys so labeled, a user typically must study all or a large part of the controller's face to locate a desired key because the key could be located anywhere on the face.

There is a need for a configurable, wall-mounted controller having a small number of keys (i.e., less than eight keys), and which can be operated by a user with less effort and attention than required for operation of conventional, configurable, controllers.

SUMMARY OF THE INVENTION

In some embodiments, the invention is a wall-mountable, configurable controller having a small number of control keys (e.g., less than eight control keys), including a first key set and a second key set (and optionally also at least one other key set). Each key set includes at least one of the control keys, and the key sets are in distinct regions of the controller's surface. The controller also has configurable circuitry including switches that are actuatable in response to actuation (e.g., pressing) of the keys. The circuitry can be configured (i.e., taught) to perform at least one control operation of a first type (e.g., a power control operation) in response to actuation of a key of the first key set, and at least one control operation of a second type (e.g., a source selection or volume control operation) in response to actuation of a key of the second key set, and optionally at least one control operation of a third type (e.g., a volume control operation) in response to actuation of a key of a third key set. The first key set is marked (e.g., each key thereof is marked by a label on or near the key) to indicate that it is dedicated to performing control operations of the first type. The second key set is marked (e.g., each key thereof is marked by a label on or near the key) to indicate that it is dedicated to performing control operations of the second type. The marking prompts a user to configure keys of the first key set to perform operations of the first type and to configure keys of the second key set to perform operations of the second type. When the controller is so configured, it can be operated by the user with less effort and attention (than required for operation of conventional configurable controllers) since not only does the controller have few keys (marked as to function), but the keys are grouped in distinct predetermined regions on the controller's face according to their function. Users can easily locate desired keys by focusing their attention on no more than a small number of keys in a specific region of the controller's face.

Preferably, the controller is modular in the sense that it can be used with interchangeable, removably mountable control key inserts. Each insert having a key for triggering execution of a control operation of the first type is configured (i.e., sized and shaped) to be removably mounted to a first region of the controller's surface but preferably is configured not to be mountable to a second region (distinct from the first region) of the surface, and each insert having a key for triggering execution of a control operation of the second type is configured to be removably mounted to the second region of the surface but preferably is configured not to be mountable to the first region of the surface. Thus, each insert having at least one key for triggering execution of a "control operation of the first type" can be swapped for an insert having a different key (or keys) for triggering execution of a control operation of the first type. For example, if the control operation of the first type is a power control operation, an insert including a single power control key (which, when mounted can be depressed once to change the target's power state, either from "power on" to "power off" or from "power off" to "power on") can be swapped for another insert including two separate power control keys (one which, when mounted can be depressed to change the target's power state from "on" to "off;" and another which, when mounted can be depressed to change the target's power state from "off" to "on"), to allow the controller to be configured to emulate either a remote control having a single power switch which turns power on and off or a remote control with two power keys (poweron and poweroff) without including any extraneous key that is not used. The controller will typically need to be reconfigured each time one control key insert is swapped for another. Preferably, the controller has switches under the first region of the controller surface and the controller can be configured to perform any of a variety of control operations of the first type in response to actuation of these switches (e.g., to perform a first control operation of the first type in response to actuation of a first one of the switches when a first key insert is mounted to the first region of the controller's surface, to perform a second control operation of the first type in response to actuation of a second one of the switches when the first key insert is mounted to the first region of the controller's surface, to perform a third control operation of the first type in response to a first actuation of a third one of the switches when a second key insert is mounted to the first region of the controller's surface, and to perform a fourth control operation of the first type in response to a second actuation of the third one of the switches when the second key insert is mounted to the first region of the controller's surface). Preferably, each key insert is marked to indicate a specific type of control operation (e.g., the insert includes a backlit window marked with a label indicating the specific type of control operation) and each key thereof is marked to indicate a control operation of such type.

A modular key insert for use with the inventive controller can have no control keys (e.g., In FIG. 7, the key insert that comprises body 59 has no control key).

A modular embodiment of the inventive controller (designed for use with interchangeable, removably mountable control key inserts) can be configured with an appropriate set of control key inserts and then configured to emulate any of a variety of different remote control devices (having different control key sets) without including any extraneous control key. The control key insert set can be chosen so as to include only keys that will be configured and used, and not to include any key that will not be configured and used.

In some embodiments, the controller's circuitry includes a limit switch that is biased in a default state but moveable into a learning state in response to user-exerted force. Typically, the limit switch includes a spring-biased actuator that can be pushed into a learning position to put the switch in its learning state and is configured to relax into a default position in the absence of pushing force thereon. When its limit switch is in the learning state, a controller operates in a learning mode in which it can be configured (e.g., re-configured). Typically, when the limit switch of a configured controller is in the default state, the controller operates in a normal operating mode (sometimes referred to herein as a control mode) to generate control signals for controlling a target in response to control key actuations. In typical embodiments, the controller includes a printed circuit board (PCB), a plate that partially covers the PCB when the controller is assembled and wall-mounted, and a limit switch mounted on the PCB so as to be user-accessible (e.g., via a hole through the plate) when the plate partially covers the PCB. Preferably, the limit switch has a spring-biased actuator that is moveable (e.g., pivotable) from a default position into a learning position (to place the limit switch in its learning state) in response to user insertion of a pin (e.g., a straightened paper clip) through a hole (that extends through the plate) into engagement with the actuator, the actuator remains in the learning position while the pin remains in engagement therewith, and the actuator relaxes back into its default position (to allow the limit switch to return to its default state) when the user pulls the pin away from the actuator. In some embodiments, the inventive controller in its learning state enters a third operating state (e.g., a cloning state) rather than its first state, when the user pulls the pin away from the actuator while pressing at least one control key of the controller.

In some embodiments, the inventive controller includes an infrared (IR) emitter and an IR receiver, and is operable in a cloning mode (as a "clone") to learn the configuration of another device (a "donor") in the sense that any configuration data stored in the donor are duplicated (in the cloning mode) in the clone so that the clone thereafter behaves as does the donor in all respects. In the cloning mode, cloning radiation propagates from an IR emitter of the donor to the clone's IR receiver. Preferably, the IR emitter (e.g., transmitter 42 of FIGS. 1 and 2) and IR receiver (e.g., receiver 40 of FIGS. 1 and 2) are positioned so that a controller's IR emitter aligns with the receiver of an identical controller when the two controllers are positioned face to face (e.g., when a first controller is wall-mounted and capable of operating as a donor, and the other controller is placed face to face with the first controller and operated in a cloning mode as a clone).

In a class of preferred embodiments, the inventive controller has a printed circuit board (PCB) including illumination elements (e.g., LEDs for backlighting control keys) positioned so that each control key of each modular control key insert that can be mounted to the controller overlies at least one of the illumination elements. Each control key insert configured to be removably mounted to a first region of the controller's surface (over a first region of the PCB) can include any of a number of different sets of control keys. Preferably, different subsets of the illumination elements are positioned to underlie the control keys of each such set of control keys, and the controller's circuitry is configured to respond to actuation of a control key (to be configured) during the learning mode by illuminating only one or more of the illumination elements that are positioned under the control key; not any of the illumination elements that is not positioned under the control key. Such configuration of the controller circuitry allows the operation of configuring a control key during the learning mode to include at least one step of illuminating a subset of the illumination elements that underlies the control key to provide visual feedback to the user, without distracting the user by illuminating elements underlying other control keys.

In some embodiments, the inventive controller is operable in a learning mode having at least one of the following features: the controller provides audible feedback as well as visual feedback to a user (e.g., the controller produces a chirp or other sound and illuminates a sequence of its control keys upon entering the learning mode), the controller provides feedback (e.g., visual feedback) to indicate whether excessive IR radiation is incident on an IR receiver of the controller (e.g., the controller has an illumination element that emits light continuously to indicate the presence of too much ambient IR radiation or to indicate that an IR signal from a nearby device is being asserted to an IR receiver of the controller) and otherwise emits a sequence of light pulses), the controller provides visual feedback indicative of strength of the configuring signal from the device to be emulated (e.g., the controller has an illumination element that emits light with intensity indicative of the strength of an IR signal from the device to be emulated), the controller provides visual and audible feedback in response to selection of a specific control key to be configured (e.g., the controller responds to selection of a specific key to be configured by emitting a flash of light from an illumination element behind the key and producing a chirp or other sound), the controller provides audible feedback at other times (e.g., upon successful learning of a code the controller produces a distinctive sound, and upon an unsuccessful attempt to learn a code the controller produces a different distinctive sound), and during a "round robin" phase of the learning mode (sometimes referred to herein as a "round robin" procedure or "round robin" mode) the controller can learn multiple codes per control key (e.g., the controller can be configured via the round robin procedure to emit a first control signal when a key is actuated once during normal operation and to emit a different control signal the next time the key is actuated during normal operation) so that the configured controller can emulate a device that sends a sequence of different signals in response to repeated actuations of a single control key. In some such embodiments, the round robin procedure has at least one of the following features: a controller in the learning mode enters a round robin mode (in which N codes for one key are to be learned) in response to a sequence of N actuations of the key; upon successful learning of the last of N codes (for one key) the controller produces a distinctive audible signal (e.g., a distinctive sequence of beeps) and/or a distinctive visual signal; and upon a failed attempt to learn N codes (for one key) the controller produces a different audible signal (or no audible signal) and/or a different visual signal (or no visual signal).

In some embodiments, the inventive controller is operable in a learning mode having a test phase in which a user can test a control key that has just been configured by pressing the key (without leaving the learning mode). Preferably, a visual signal is automatically emitted (after a key is configured) to prompt the user to test the key, the user then actuates the key to test it (i.e., to observe whether it performs its intended control function), and the user can then perform any desired learning mode operation (e.g., can reconfigure the just-tested key, or configure another key) or terminate learning mode operation.

In some embodiments, the inventive controller is operable in a macro phase of the learning mode (sometimes referred to herein, including in the claims, as a "macro mode") in which the controller is configured to assert (in the control mode, after exit from both the macro mode and the learning mode) a sequence of different control signals in response to a single actuation of a single control key. In some implementations, when two or more codes have been learned by one key (e.g., during a "round robin" mode as mentioned above), the user initiates operation in the macro mode by actuating (e.g., pressing) the key for more than a minimum time period (e.g., for at least M seconds), thereby configuring the controller to send all the learned codes in a sequence each time the user actuates the key once during the control mode (i.e., after exit from the learning mode). In preferred ones of the latter implementations, in response to the next entry into the macro phase of the learning mode (i.e., in response to the next actuation of the relevant key for more than the minimum time period as described), the controller is reconfigured to send the learned codes sequentially in response to a sequence of user actuations of the key during the control mode (i.e., to send one code per key actuation), so that the controller can effectively be toggled between two states by successive entries into the macro phase of the learning mode: a first state in which the controller sends all the learned codes in a sequence each time the user actuates the key once during the control mode; and a second state in which the controller sends one code per key actuation in the control mode (a sequence of individual ones of the learned codes in response to a sequence of key actuations during the control mode).

In some embodiments, control keys of the inventive controller are transparent or translucent, switches are mounted under the control keys, and illumination elements (e.g., LEDs) are positioned near the switches are controlled to illuminate (i.e., backlight) each of the control keys that overlies a configured switch. The illumination elements are controlled so that they do not illuminate any control key that does not overlie a configured switch. This allows the user to determine at a glance which keys have not been configured (e.g., which keys overlie only unconfigured switches) and are thus not available for use. Preferably, when a key has been configured, an illumination element illuminates the key with relatively low brightness (e.g., 50% of maximum brightness). Also preferably, when a configured key is actuated, the illumination element illuminates the key with relatively high brightness (e.g., maximum brightness) and optionally also the controller provides audible feedback to the user (e.g., produces a beep) to indicate that a configured key has been actuated. Other aspects of the invention are methods for configuring and operating any embodiment of the inventive controller, and controller systems each including modular controller key inserts and a wall-mountable subassembly to which subsets of the inserts can be removably mounted.

DETAILED DESCRIPTION OF PREFERRED EMBODIMENTS

Figure 1:
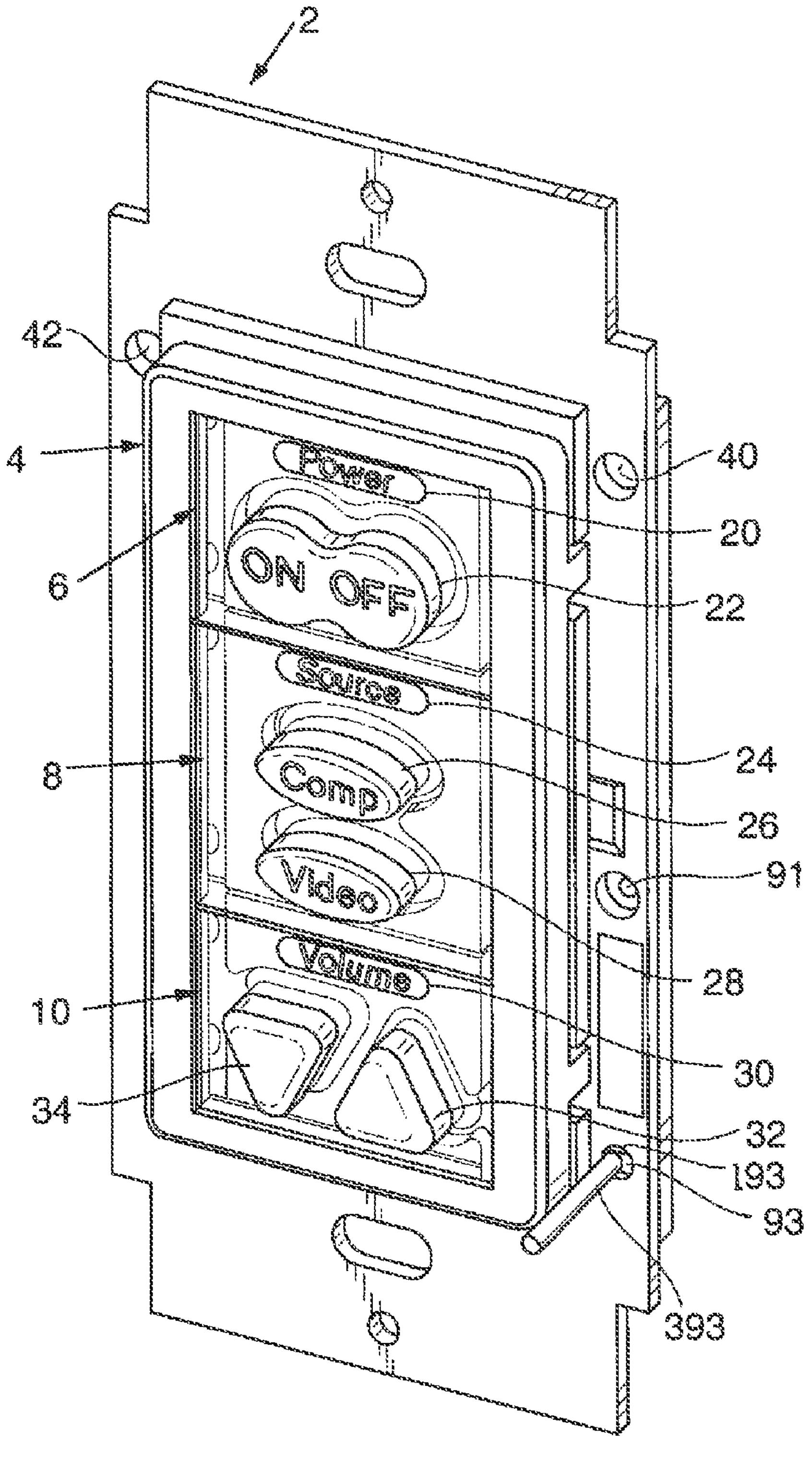
FIG. 1 is a perspective view of the front side of an embodiment of the inventive controller (with pin 393 for actuating its learning mode entry switch 93).

A wall-mountable embodiment of the inventive controller will be described with reference to FIGS. 1-8. As shown in FIGS. 1 and 3, this controller includes metal back plate 2 which is configured to be mounted by screws (not shown) in an electrical box in a wall. Printed circuit board ("PCB") 12 is mounted to the back side of plate 2 with insulation plate 14 (shown in FIG. 8 but not visible in FIGS. 1 and 3) positioned between PCB 12 and back plate 2 to electrically insulate PCB 12 from plate 2. Circuit elements (to be described below) of the controller are surface mounted to PCB 12. These circuit elements include configurable microprocessor 80, crystal oscillator 81 (or another clock signal generation element) for use in generating a clock signal for use by microprocessor 80, EEPROM 82 (or another memory) for use by microprocessor 80 for storage of data which can configured, learned, cloned, and/or preloaded, illumination elements 83-91 (controlled by microprocessor 80), pressure-sensitive switches 60-77, and infrared receiver 40 (for asserting control bits to microprocessor 80 in response to received infrared radiation), infrared transmitter 42 (for transmitting modulated infrared radiation in response to control bits asserted by microprocessor 80, for purposes to be explained below), and connector unit 92. Preferably, each of illumination elements 83-91 is a light-emitting diode (LED) and thus for convenience elements 83-91 will be referred to herein as LEDs (although in some embodiments they can be illuminating elements other than LEDs). In a typical implementation, each of switches 60-77 is pressure-sensitive in the sense that a portion thereof is configured to move in response to pressure exerted thereon (by a control key that has moved into engagement with the switch in response to user actuation) to a switch-closed position (in which a conductive element of the switch closes an open circuit on PCB 12) from a switch-open position (in which the conductive element does not close the open circuit).

Connector unit 92 includes IR emitter output 92A for asserting (in response to control bits asserted by microprocessor 80) target control signals (e.g., for use in generating modulated target control infrared radiation) to the target (the projector or other device to be controlled). The target control signals are used to control the target. Typically the target control signals propagate from IR emitter output 92 to an IR emitter (not shown, but positioned near the target) via a wire pair, modulated target control IR radiation is generated in the IR emitter in response to the target control signals, and the modulated target control IR radiation is transmitted from the IR emitter to the target. Connector unit 92 also includes power terminal 92B and ground terminal 92C, across which a power supply (not shown) applies a suitable DC voltage (e.g., 6 Volts) to power the controller.

In typical embodiments, the target is a projector or other audiovisual device (e.g., another type of audiovisual display device).

The controller of FIGS. 1 and 3 also includes bezel 4, insert bodies 6, 8, and 10, control keys 22, 26, 28, 32, and 34, and windows 20, 24, and 30.

The assembly comprising bezel 4, insert bodies 6 (or 56), 8 (or 58), and 10 (or 59), control keys 22, 26, 28, and optionally control keys 32 and 34, and windows 20, 24, and optionally window 30, is removably mounted to back plate 2 with the control keys positioned over switches 60-77 of PCB 12. When the controller is assembled, pressure-sensitive switches 60, 61, and 62 are accessible (by control keys) through the upper row of holes 160 through plate 2, pressure-sensitive switches 63, 64, and 65 are accessible through the lower row of holes 160 through plate 2, pressure-sensitive switches 66-77 are accessible through corresponding holes through plate 2, light can propagate from LEDs 83 through holes 183 through plate 2, light can propagate from LEDs 104 through holes 184 through plate 2, light can propagate from LEDs 85 through holes 185 through plate 2, light can propagate from LEDs 106 and 107 through holes 167 through plate 2, light can propagate from LEDs 88 through corresponding holes through plate 2, and light can propagate from LEDs 109 and 110 through holes 189 through plate 2.

This assembly can be dimensioned so as to have the conventional format known as Decora® format, so that a conventional Decora® style faceplate can be mounted over it. If the inventive assembly is so dimensioned, it can be mounted in an electrical box in which a conventional Decora® style control unit (e.g., a conventional Decora® style light control unit) can be mounted, and the inventive assembly can then covered by a conventional Decora® style faceplate.

Insert body 6 has holes 6A and 6B (sometimes referred to as "slots") for retaining window 20 and control key 22, respectively. Insert body 8 has holes 8A, 8B, and 8C (sometimes referred to as "slots") for retaining window 24, control key 26, and control key 28, respectively. Insert body 10 has holes 10A, 10B, and 10C (sometimes referred to as "slots") for retaining window 30, control key 34, and control key 32, respectively. Inserts comprising bodies 6, 8, and 10, and optionally also keys and/or windows in slots thereof, are modular in the sense that each insert can be used interchangeably with other inserts having similarly sized and shaped insert bodies. For example, insert body 56 (shown in FIGS. 6 and 7) with window 20 and control key 84 retained in slots 56A and 56B extending therethrough can be used in place of insert body 6 (with window 20 and control key 22 retained in slots 6A and 6B). For another example, insert body 58 (shown in FIGS. 6 and 7) with window 24 and control key 86 (retained in slots 58A and 58B extending therethrough) can be used in place of insert body 8 (with window 24 and control keys 26 and 28 retained in slots 8A, 8B, and 8C). For another example, opaque insert body 59 (having no control keys) can be used in place of insert body 10 (with window 30 and control keys 34 and 32 retained in slots 10A, 10B, and 10C).

Control keys 22, 26-28, 32-34, 84, and 86 are movable relative to plate 2 (and PCB 12) so that the user can depress the keys against pressure-sensitive switches (mounted on PCB 12) to actuate the switches. The control keys can be rubberized keys or keys of another type. Windows 20, 24, and 30 are fixed relative to plate 2 and PCB 12.

Control key 22 has a first portion (labeled "ON") and a second portion (labeled "OFF"), and can be toggled relative to PCB 12 such that either the first portion can be pressed against switches 60 and 63 (to actuate switches 60 and 63) or the second portion can be pressed against switches 62 and 65 (to actuate switches 62 and 65). Thus, although key 22 is a single element, it functions as two independent keys (one overlying switches 60 and 63 and operable to actuate one or both of switches 60 and 63; the other overlying switches 62 and 65 and operable to actuate one or both of switches 62 and 65). A pair of switches (e.g., 60 and 63, or 62 and 65) can be provided under each end portion of key 22 to ensure that the controller will respond to off-angle key presses by the user (e.g., a key press which actuates only one switch in such pair). It is contemplated that the first portion (labeled "ON") of key 22 will be configured separately from the second portion (labeled "OFF") of key 22. In a variation on the FIG. 1 embodiment, key 22 is replaced by two separate keys: a POWER ON key overlying switches 60 and 63 and operable to actuate one or both of switches 60 and 63; and a POWER OFF overlying switches 62 and 65 and operable to actuate one or both of switches 62 and 65.

Each of windows 20, 24, and 30 is an element that is at least partially translucent (or transparent) and is marked with a label identifying the function of the key(s) in the insert body in which the window is positioned. Appropriate ones of the windows are backlit by light emitting elements, in a manner to be explained below. For example, window 20 can be marked with the opaque label "Power" to indicate that control key 22 of insert body 6 (or control key 84 of insert body 56) controls assertion of power to the projector (or other device) being controlled, window 24 can be marked with the opaque label "Source" to indicate that control keys 26 and 28 of insert body 8 (or control key 86 of insert body 58) controls the source of data (e.g., display data) to be asserted to the projector (or other device) being controlled, and window 30 can be marked with the opaque label "Volume" to indicate that control keys 32 and 34 of insert body 10 controls the volume of the audio output of the projector (or other device) being controlled.

Figure 2:
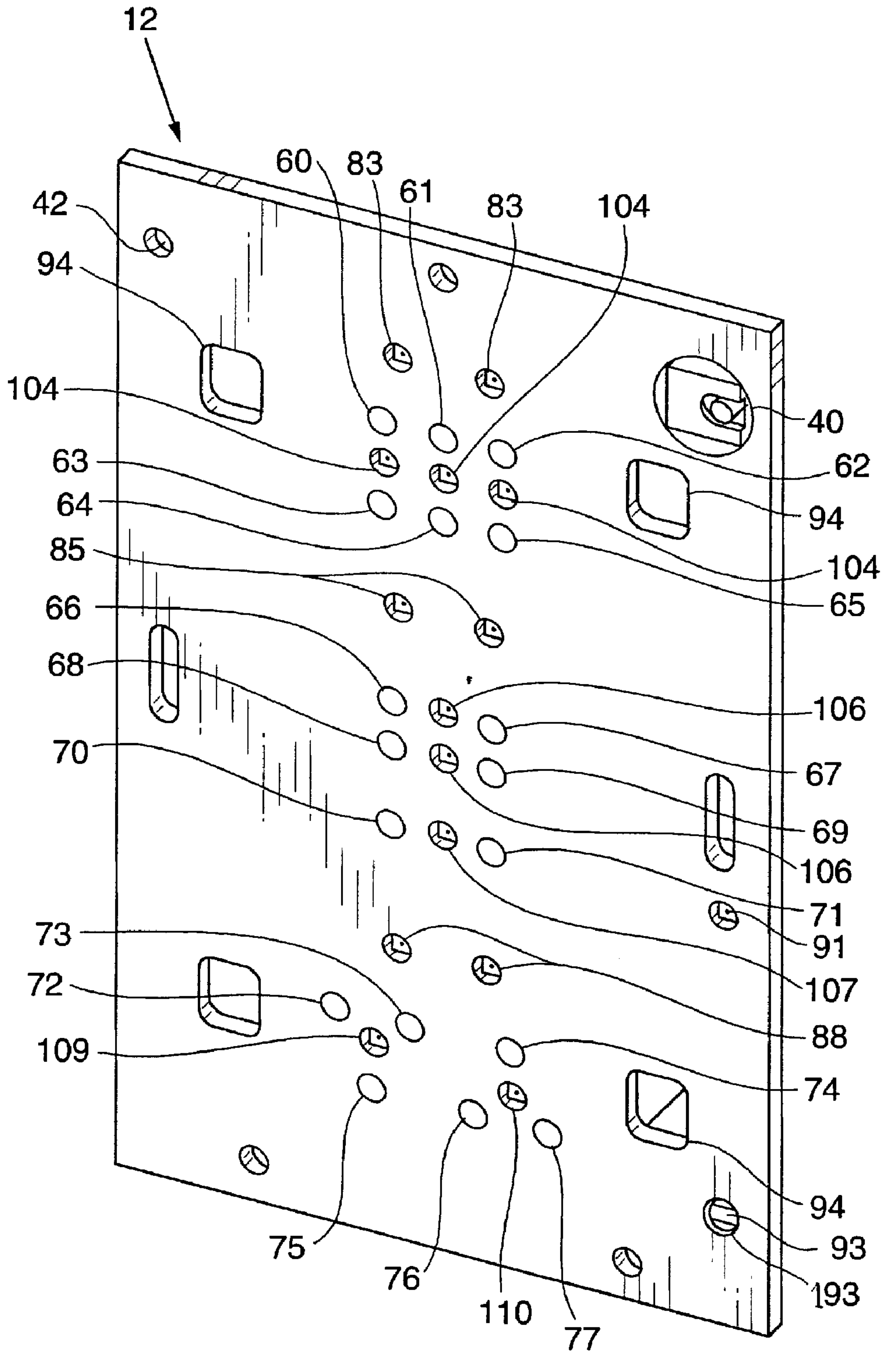
FIG. 2 is a perspective view of the front side of an embodiment of printed circuit board 12 of the FIG. 1 controller.
Figure 3:
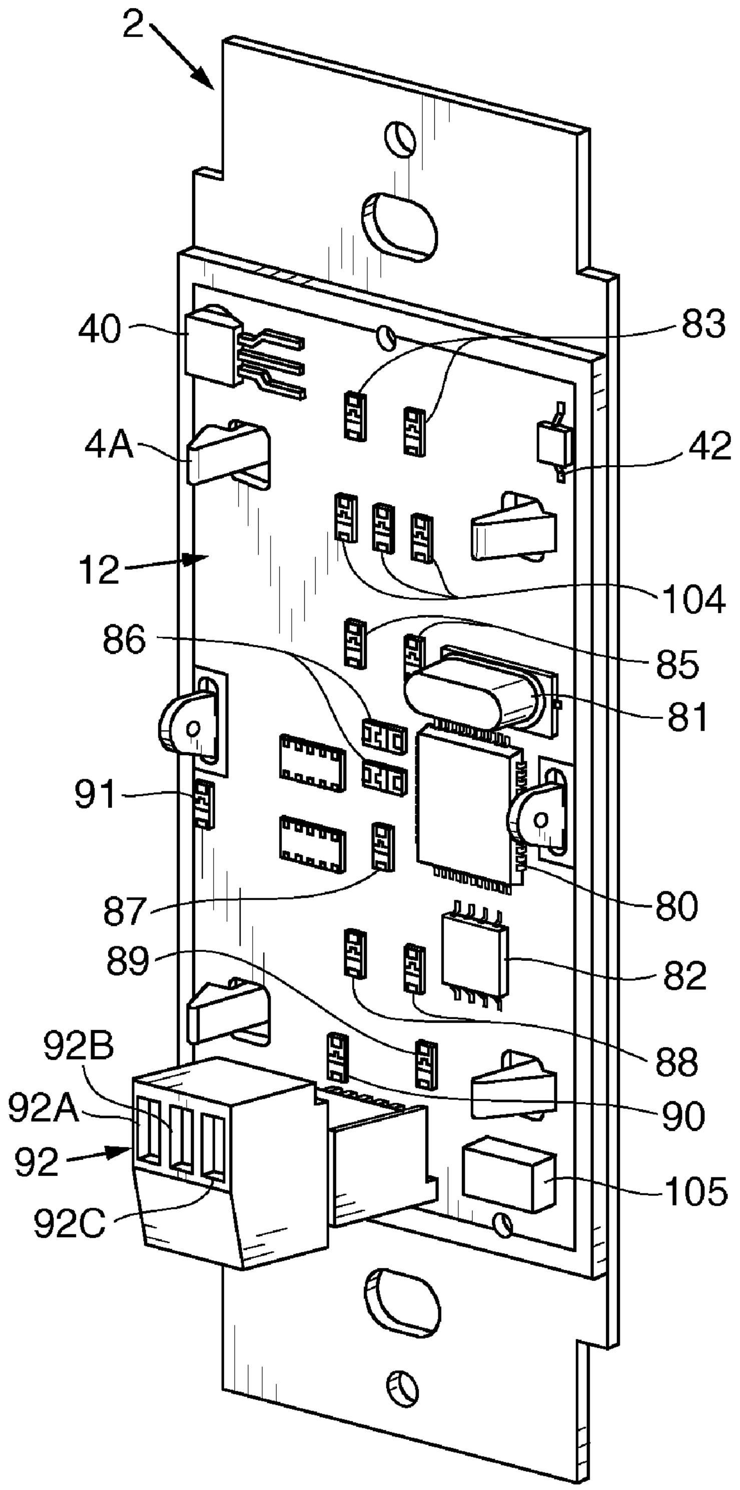
FIG. 3 is a perspective view of the back side of the FIG. 1 controller.

To assemble the inventive controller, PCB 12 (whose front face is shown in FIG. 2 and whose back face is shown in FIG. 3) and insulation plate 14 (shown in FIG. 8) are aligned with plate 2, with plate 14 between the front face of PCB 12 and the back surface of plate 2, and holes 94 (extending through PCB 12) aligned with holes 304 (extending through plate 2) and holes 204 (extending through plate 14). Window 20 and control key 22 are placed in holes 6A and 6B, respectively, of insert body 6. Window 24, control key 26, and control key 28 are placed in holes 8A, 8B, and 8C, respectively, of insert body 8. Window 30, control key 34, and control key 32 are placed in holes 10A, 10B, and 10C, respectively, of insert body 10. Insert bodies 6, 8, and 10 (with the control keys positioned in the holes thereof) are then aligned with bezel 4 in positions to be described below, and prongs 4A of bezel 4 are inserted through the aligned holes 94, 304, and 204 of elements 2, 12, and 14, to assemble all elements of the controller together as shown in FIGS. 1 and 3. As prongs 4A of bezel 4 are inserted through the aligned holes 94, 304, and 204, alignment posts 50 of insert body 10 are received by holes 150 (which extend into plate 2) to align insert body 10 with plate 2, alignment posts 51 of insert body 8 are received by holes 151 (which extend into plate 2) to align insert body 8 with plate 2, and alignment posts 52 of insert body 6 are received by holes 152 (which extend into plate 2) to align insert body 6 with plate 2.

When the controller of FIGS. 1-8 has been configured for use with insert bodies 6, 8, and 10 (and control keys 22, 26, 28, 32, and 34), the controller causes IR emitter 92A to assert a power "on" signal in response to user actuation of switch 60 and/or switch 63 (i.e., when the user toggles key 22 to press the left end of the key, labeled "ON," against switch 60 and/or switch 63, to assert a power "off" signal in response to user actuation of switch 62 and/or switch 65 (i.e., when the user toggles key 22 to press the right end of the key, labeled "OFF," against switch 62 and/or switch 65, to assert a source selection signal that selects a computer as a source in response to user actuation of one or more of switches 66, 67, 70, and 71 (i.e., when the user presses key 26 against one or more of switches 66, 67, 70, and 71), to assert a source selection signal that selects a video source (e.g., DVD player) as a source in response to user actuation of one or both of switches 70 and 71 (i.e., when the user presses key 28 against one or both of switches 70 and 71), to assert a volume decrease signal in response to user actuation of one or more of switches 72, 73, and 75 (i.e., when the user presses key 34 against one or more of switches 72, 73, and 75), and to assert a volume increase signal in response to user actuation of one or more of switches 74, 76, and 77 (i.e., when the user presses key 34 against one or more of switches 74, 76, and 77).

In order to reduce the complexity and manufacturing cost of the controller, all power control keys are positioned in the upper portion of the controller (in front of switches 60, 61, 62, 63, 64, and 65 of PCB 12). Microprocessor 80 (and EEPROM 82) are implemented so that switches 60-65 can be configured to implement only power control functions (but to implement any of a variety of power control functions) in response to user-actuation of a small number of power control keys (e.g., one power control key such as key 22 that can be toggled between two states to depress either of two distinct subsets of switches 60-65, or one power control key such as key 84 that can be pressed against a single subset of switches 60-65, or two power control keys either of which can be depressed against a different subset of switches 60-65). For example, microprocessor 80 (and EEPROM 82) can be configured so that the controller causes IR emitter 92A to assert a power "on" signal in response to a first user actuation of a single large key (e.g., key 84 shown in FIG. 7) to depress any of switches 60-65, and to assert a power "off" signal in response to the next user actuation of the same key (key 84) to depress any of switches 60-65, and so on. Thus, the controller can be configured to implement a number of different power control functions in response to assertion of different ones (or different combinations and/or sequences) of a small number of switches positioned in a power control region (e.g., switches 60-65 positioned in the upper center of PCB 12). Thus, the upper portion of the controller (in front of switches 60, 61, 62, 63, 64, and 65) can be a dedicated power control region, and any of a variety of power control inserts (e.g., an insert including body 6 or 56) all having alignment posts (e.g., posts 52) shaped and positioned to mate with corresponding holes extending through plate 2 (to align the power control insert with plate 2) can be used with the controller. Each such power control insert has a small number of power control keys that are positioned over an appropriate subset of switches 60, 61, 62, 63, 64, and 65 when the power control insert is properly aligned with plate 2 (and retained by bezel 4 in this alignment).

Also to reduce user interface complexity and manufacturing cost of the controller, all source selection keys are positioned in the middle portion of the controller (in front of switches 66, 67, 68, 69, 70, and 71 of PCB 12). Microprocessor 80 (and EEPROM 82) are implemented so that switches 66-71 can be configured to implement only source selection functions (but to implement any of a variety of source selection functions) in response to user-actuation of a small number of source selection keys (e.g., two keys such as key 26 and 28 that can be pressed against either of two distinct subsets of switches 66-71, or single key such as key 86 that can be pressed against a single subset of switches 66-71). For example, microprocessor 80 (and EEPROM 82) can be configured so that the controller causes IR emitter 92A to assert a first source selection signal in response to a first user actuation of a single large key (e.g., key 86 shown in FIG. 7) to depress either or both of switches 68 and 69, and to assert a second source selection signal in response to the next user actuation of the same key (key 86) to depress either or both of switches 68 and 69, and so on. Thus, the controller can be configured to implement a number of different source selection functions in response to assertion of different ones (or different combinations and/or sequences) of a small number of switches positioned in a source selection region distinct from the above-mentioned power control region (e.g., switches 66-71 positioned in the middle center of PCB 12). Thus, the middle portion of the controller (in front of switches 66, 67, 68, 69, 70, and 71) can be a dedicated source selection region, and any of a variety of source selection inserts (e.g., an insert having body 8 and 58) all having alignment posts (e.g., posts 51) shaped and positioned to mate with corresponding holes extending through plate 2 (to align the source selection insert with plate 2) can be used with the controller. Each such source selection insert has a small number of source selection keys that are positioned over an appropriate subset of switches 66, 67, 68, 69, 70, and 71 when the source selection insert is properly aligned with plate 2 (and retained by bezel 4 in this alignment).

Also to reduce the complexity and manufacturing cost of the controller, all volume control keys are positioned in the lower portion of the controller (in front of switches 72, 73, 74, 75, 76, and 77 of PCB 12). Microprocessor 80 (and EEPROM 82) are implemented so that switches 72-77 can be configured to implement only volume control functions (but to implement any of a variety of volume control functions) in response to user-actuation of a small number of volume control keys (e.g., two keys such as key 32 and 34 that can be pressed against either of two distinct subsets of switches 72-77, or a single key that can be pressed against a single subset of switches 72-77). Thus, the controller can be configured to implement a number of different volume control functions in response to assertion of different ones (or different combinations and/or sequences) of a small number of switches positioned in a volume control region distinct from the above-mentioned source selection region and power control region (e.g., switches 72-77 positioned in the lower center of PCB 12). Thus, the lower portion of the controller (in front of switches 72, 73, 74, 75, 76, and 77) can be a dedicated volume control region, and any of a variety of volume control inserts (e.g., an insert having body 10 and 59) all having alignment posts (e.g., posts 50) shaped and positioned to mate with corresponding holes extending through plate 2 (to align the volume control insert with plate 2) can be used with the controller. Each such volume control insert has a small number of volume control keys that are positioned over an appropriate subset of switches 72, 73, 74, 75, 76, and 77 when the volume control insert is properly aligned with plate 2 (and retained by bezel 4 in this alignment).

Preferably, posts 50 have different shape and/or relative spacing than do posts 51, so that the controller cannot be assembled with a volume control insert having posts 50 positioned where a source selection insert having posts 51 should be positioned. Similarly, posts 50 preferably have different shape and/or relative spacing than do posts 52, so that the controller cannot be assembled with a volume control insert having posts 50 positioned where a power control insert having posts 52 should be positioned, and posts 51 preferably have different shape and/or relative spacing than do posts 52, so that the controller cannot be assembled with a source selection insert having posts 51 positioned where a power control insert having posts 52 should be positioned.

Many variations on the above-described embodiment are possible. For example, it is contemplated that some embodiments of the inventive controller have distinct, dedicated volume control, power control, and source selection regions arranged differently relative to each other than in the controller of FIGS. 1-8 (e.g., with a dedicated volume control region between dedicated source selection and power control regions). For another example, other embodiments of the inventive controller have a small number of distinct, dedicated control regions (other than a set of three dedicated volume control, power control, and source selection regions) arranged in predetermined positions relative to each other, each control region having a small number of configurable switches that can be configured to implement control functions of a different type.

The controller of FIGS. 1-8 is modular (and each of a class of other embodiments of the inventive controller is modular) in the sense that the assembled, configured controller can be disassembled, one or more of its control inserts exchanged for a control insert of the same type (e.g., a first power control insert exchanged for a different power control insert), and the controller's microprocessor and EEPROM then reconfigured for use with the replacement control insert(s). The controller of FIGS. 1-8 has $2^3=8$ different configurations, assuming that two different control inserts are available for use with each of its three distinct, dedicated control regions.

Figure 4:
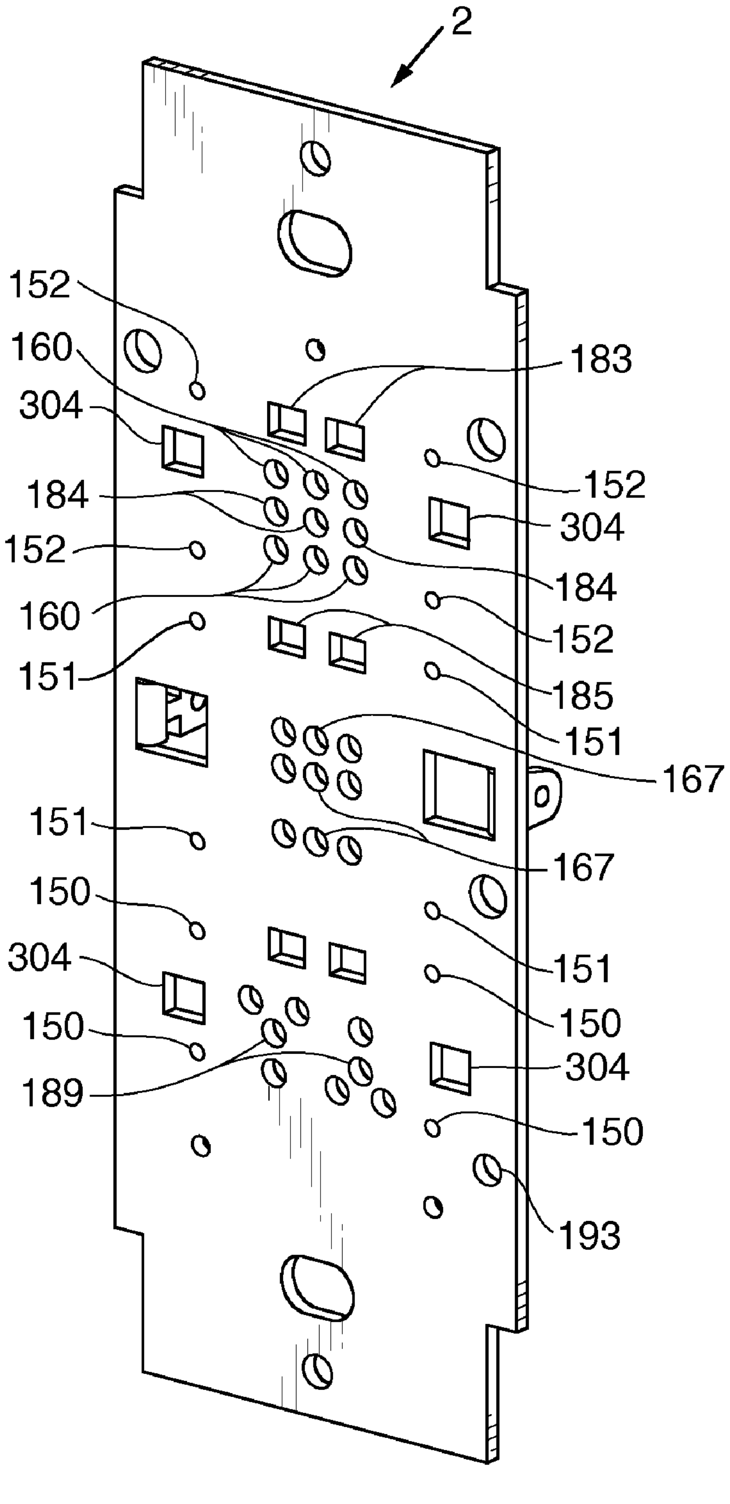
FIG. 4 is a perspective view of metal back plate 2 of the FIG. 1 controller.
Figure 5:
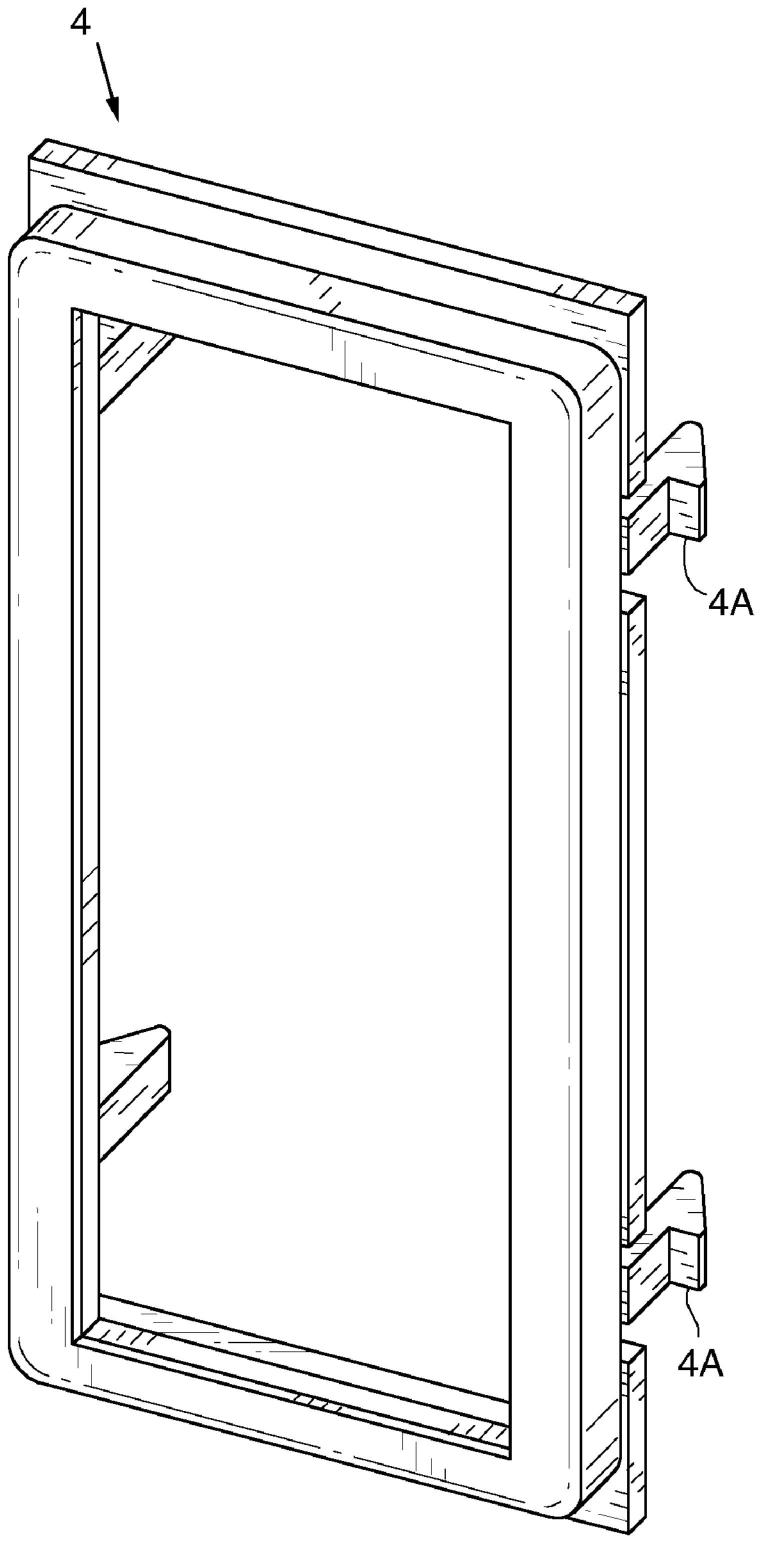
FIG. 5 is a perspective view of bezel 4 of the FIG. 1 controller.

Bezel 4 of the FIG. 1 controller is preferably shaped as shown in FIG. 5 for use with the other elements shown in FIGS. 1-4 and 6-8.

Figure 6:
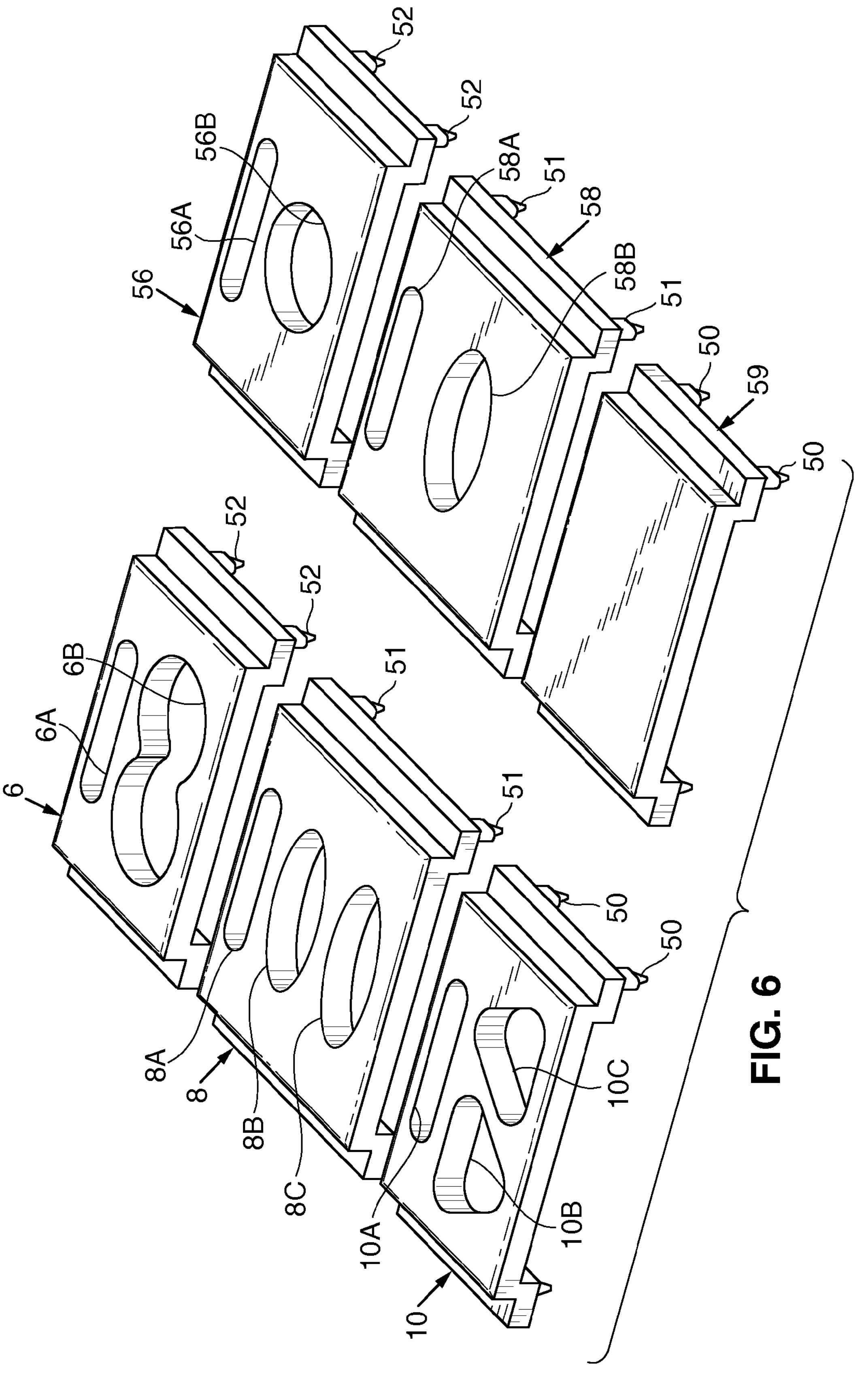
FIG. 6 is a perspective view of a plastic cast (which can be formed by injection molding) which defines modular insert bodies 6, 8, and 10 and modular insert bodies 56, 58, and 59. Various combinations of the insert bodies can be positioned within bezel 4, and the assembly comprising bezel 4 and the insert bodies then snapped onto back plate 2 of the FIG. 1 controller.

The bodies of the modular inserts employed in the controller of FIGS. 1-8 can be made of rigid plastic that has been formed in the desired shape by injection molding. FIG. 6 is a perspective view of a plastic cast (which can be formed by injection molding) which defines three modular insert bodies 6, 8, and 10 and modular insert bodies 56, 58, and 60. Various combinations of the insert bodies can be positioned within bezel 4, and the assembly comprising bezel 4 and the insert bodies then snapped onto back plate 2 of the controller.

Figure 7:
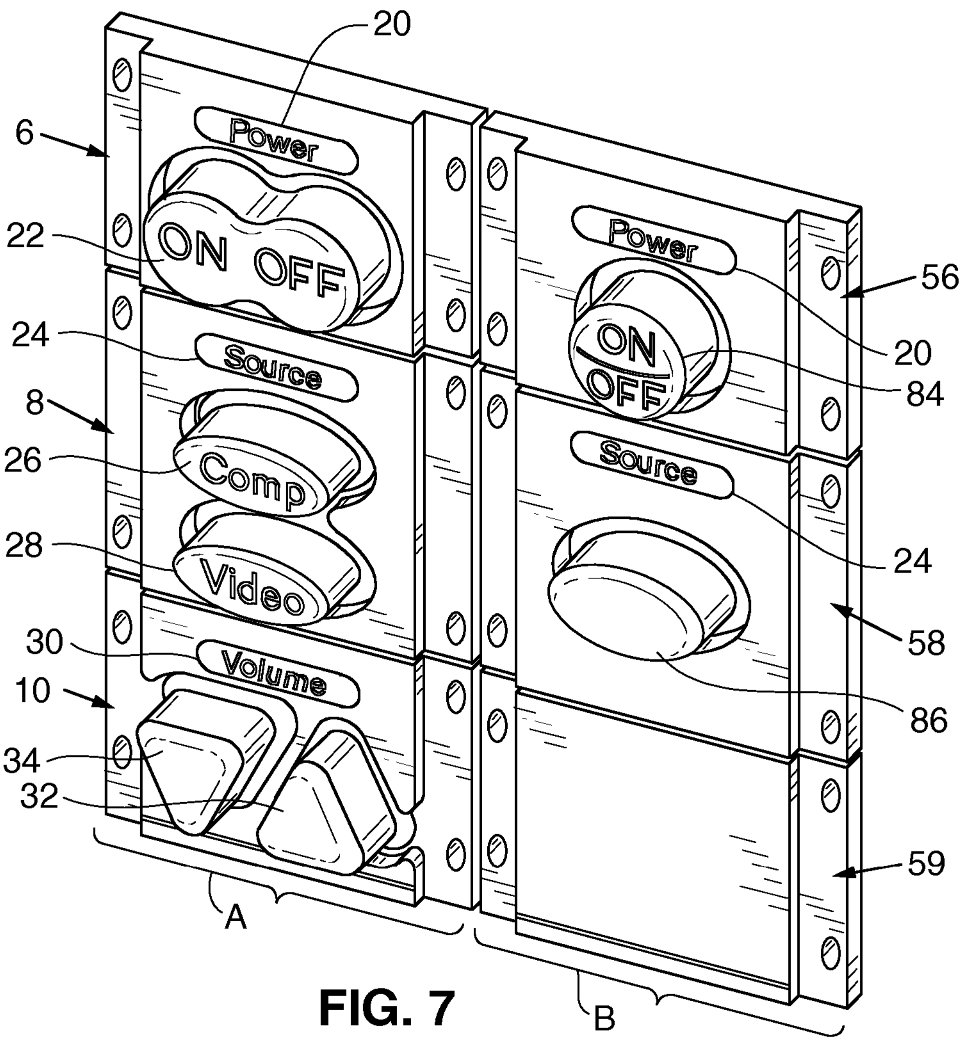
FIG. 7 is a perspective view of modular inserts, including the insert bodies shown in FIG. 6, and windows and control keys inserted in slots defined by the insert bodies.

FIG. 7 is a perspective view of modular inserts, including the insert bodies shown in FIG. 6 and windows and control keys inserted in slots defined by the insert bodies: a first set (labeled "A") consisting of power control insert body 6 (with window 20 and key 22 positioned in slots thereof), source selection insert body 8 (with window 24 and keys 26 and 28 positioned in slots thereof), and volume control insert body 10 (with window 30 and keys 32 and 34 positioned in slots thereof); and a second set (labeled "B") consisting of power control insert body 56 (with window 20 and key 84 positioned in slots thereof), source selection insert body 58 (with window 24 and key 86 positioned in slots thereof), and volume control insert body 59 (having no slots). Insert set A can be used interchangeably with insert set B, provided that microprocessor 80 is configured for use with the relevant insert set.

Or, any of various combinations of inserts from set A and set B can be used. For example, in the FIG. 1 system, insert body 59 can be substituted for insert body 10 (and window 30 and keys 32 and 34). Or, in the FIG. 1 system, insert body 58 (with window 24 and key 86 positioned in slots thereof) can be substituted for insert body 8 (and window 24 and keys 26 and 28). Despite use of the term "set" of modular inserts to denote key inserts removably installed as elements of a typical embodiment of the inventive controller, it is specifically intended that one or more other modular inserts can be substituted for any of the removably installed inserts.

Various embodiments of the inventive controller are configured in a variety of different ways. For example, some embodiments are configured using conventional techniques for implementing learning modes of conventional remote controllers.

Figure 8:
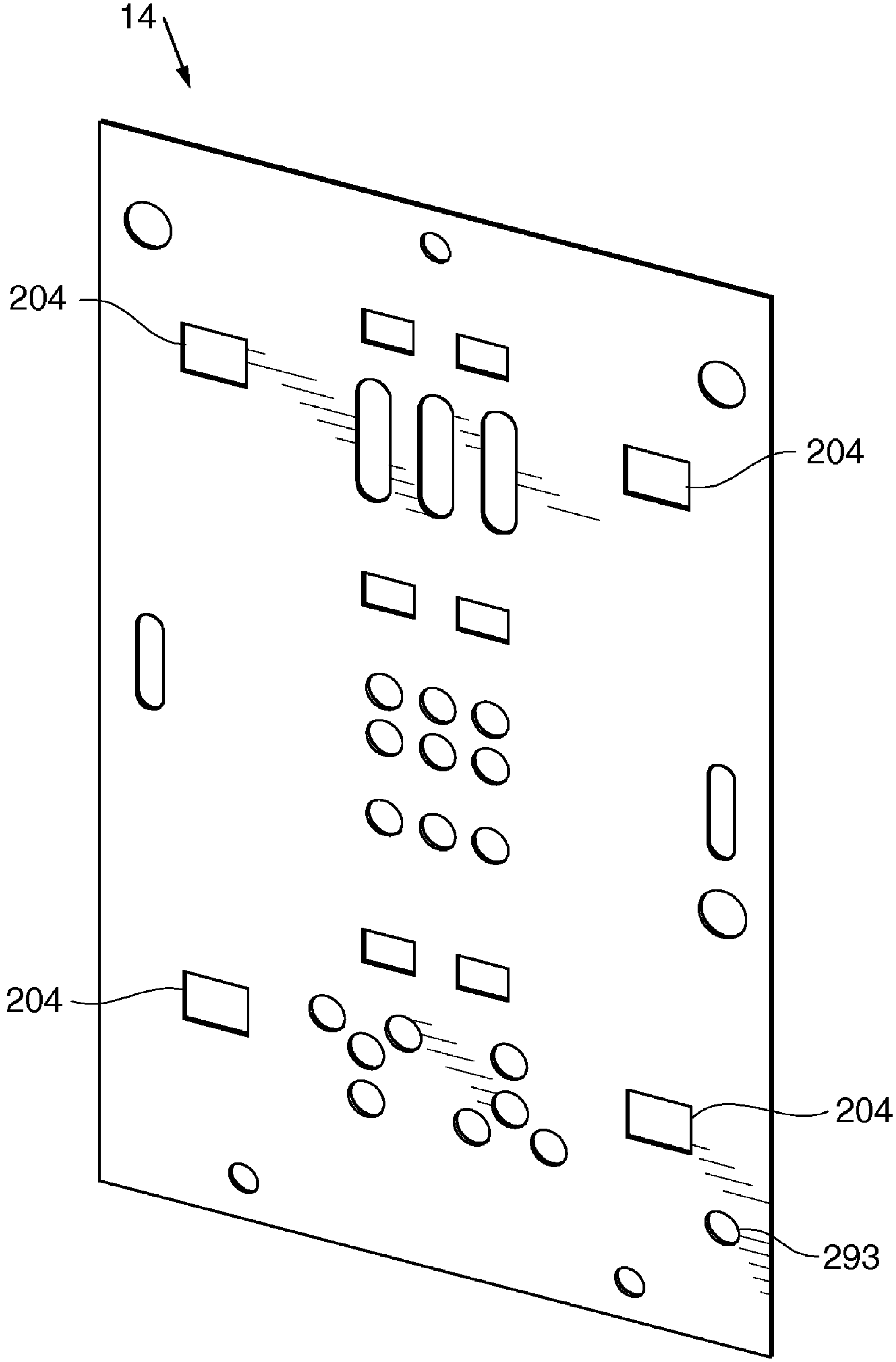
FIG. 8 is a perspective view of insulation plate 14, which can be positioned between printed circuit board 12 and back plate 2 in the controller of FIGS. 1 and 3.

Some implementations of the assembled controller of FIGS. 1 and 3 are configured in accordance with the invention as follows. The user selects the learning mode by actuating a learning mode entry switch on PCB 12 (e.g., by actuating the switch for a short time using a pin 393 or other sharp object, or moving the switch from a first to a second position). Preferably, the learning mode entry switch is a limit switch 93 having a spring-biased actuator arm (partially shown in FIG. 1). Hole 193 (extending through plate 2 as shown in FIGS. 1 and 4), hole 293 (extending through insulation plate 14 as shown in FIG. 8), and switch 93 of the assembled controller are aligned with each other so that switch 93 is accessible through aligned holes 193 and 293, even when the controller has been wall mounted.

Limit switch 93 is biased in a default state with its actuator arm biased (toward the front of the controller) in a default position, but is moveable into a learning state in response to user-exerted force that displaces (pivots) the arm toward the back of the controller into a learning position. Limit switch 93 returns into the default state when the actuator arm relaxes into its default position (when a user ceases to exert displacing force on the actuator arm). More specifically, limit switch 93's actuator arm is spring-biased in its default position and pivots from the default position into the learning position in response to user insertion of pin 393 (which can be a straightened paper clip) through aligned holes 193 and 293 into engagement with the actuator arm. Preferably, the diameter of pin 393 is slightly smaller than the diameter of hole 193 so that friction between plate 2 and pin 393 retains pin 393 in engagement with the actuator arm when the user releases pin 393, causing the actuator arm to remain in the learning position. When the user removes pin 393 (from holes 193 and 293), the actuator arm relaxes back into its default position, allowing limit switch 93 to return to its default state (thereby exiting the learning mode).

Use of a special switch (e.g., switch 93 or a variation thereon) to control entry into the learning mode (rather than one or more of the control keys) simplifies the controller's design for the following reason. Due to the controller's modularity, there is no guarantee that any specific control key (or combination of control keys) will be present in a user-customized version of the controller. It would be impractical to define a set of permissible control key actuations such that at least one of them would always be possible (to cause entry into or exit from the learning mode) and to implement the controller's circuitry to respond in the desired way to all possible control key actuations in the set. The described preferred embodiment of limit switch 93 has the advantages of being implementable with very small size, and being accessible from the front of the controller even when the controller has been wall mounted.

When the controller has been configured and limit switch 93 is in the default state, the controller operates in a normal operating mode (sometimes referred to herein as a control mode) to generate control signals for controlling a target in response to control key actuations, or in a cloning mode (to be described below). When limit switch 93 is in the learning state, the controller operates in a learning mode in which it can be configured (e.g., re-configured). In preferred implementations, the controller in its learning mode enters the cloning mode when a user pulls pin 393 away from the actuator arm while depressing at least one of the controller's control keys, and the controller in its learning mode enters the control mode when a user pulls pin 393 away from the actuator arm without depressing any of the control keys.

Optionally, microprocessor 80 is configured to illuminate LED 91 (preferably in a manner to be described below) while it operates in the learning mode. Once microprocessor 80 has entered the learning mode, a handheld remote controller capable of controlling the target (e.g., a handheld remote controller manufactured for use with the target) is employed to configure the inventive controller. The user presses the first control key of the inventive controller to be configured (e.g., one of keys 22, 26, 28, 32, 34, 84, and 86), points the IR transmitter of the handheld remote controller at IR receiver 40, and operates the handheld remote controller to execute the control operation to be emulated by actuating the first control key. Typically then, control bits indicated by infrared radiation are received at IR receiver 40 and processed by microprocessor 80 which subsequently sets bits in EEPROM 82 such that microprocessor 80 and EEPROM 82 are thereby configured, such that microprocessor 80 responds (during normal operation after the inventive controller has been completely configured) to actuation of the first control key by accessing these bits in EEPROM 82 and causing IR emitter output 92A to assert a control signal indicative of "first key emulating" control bits (control bits that emulate the control bits received from the handheld remote controller). The user then presses the next control key to be configured (e.g., another one of keys 22, 26, 28, 32, 34, 84 and 86), again points the IR transmitter of the handheld remote controller at IR receiver 40, and operates the handheld remote controller to execute the control operation to be emulated by actuating the next control key. Typically then, control bits indicated by infrared radiation are received at IR receiver 40 and processed by microprocessor 80 which subsequently sets bits in EEPROM 82 such that microprocessor 80 and EEPROM 82 are thereby configured, such that microprocessor 80 responds (during normal operation after the inventive controller has been completely configured) to actuation of the next control key by accessing these bits in EEPROM 82 and causing IR emitter output 92A to assert a control signal indicative of "next key emulating" control bits (control bits that emulate the control bits received from the handheld remote controller during the current configuring step). This process is repeated until all keys of the inventive controller have been configured. The user then actuates learning mode entry switch 93 again to cause the inventive controller to exit the learning mode and resume operation in the control mode.

During configuring of each key of the inventive controller, the key is depressed to actuate a corresponding one (or set) of switches 60-77. Infrared radiation indicative of (e.g., modulated with) control bits is then transmitted to receiver 40, and the control bits are in turn asserted from receiver 40 to microprocessor 80. In response, microprocessor 80 and EEPROM 82 are configured to respond (during normal operation after the inventive controller has been completely configured) to subsequent actuation of the appropriate one (or set) of switches 60-77 by causing IR emitter output 92A to assert a control signal indicative of the control bits received at receiver 40.

In a class of implementations, the controller of FIGS. 1-8 is configured to operate in a learning mode having all or some of the following features:

The controller provides audible feedback as well as visual feedback to user during learning mode operation. In a typical implementation, a small speaker mounted on PCB 12 (e.g., speaker 105 of FIG. 3) produces chirps or other sounds in response to control signals asserted from microprocessor 80 at appropriate times, and microprocessor 80 also causes appropriate ones of LEDs 83-90 to illuminate corresponding ones of the control keys at appropriate times. For example, microprocessor 80 may indicate entry into the learning mode by causing appropriate ones of LEDs 83-90 to illuminate a sequence of the control keys and causing the speaker to emit a chirp;

The controller provides visual (and optionally also audible) feedback to indicate excessive ambient radiation during learning mode operation. In a typical implementation, LED 91 emits no light in the controller's control mode, and LED 91 emits a distinctive sequence of flashes (e.g., it blinks regularly and slowly) upon entry into the learning mode (if there is not an excessive amount of ambient IR radiation present). Typically, microprocessor 80 is coupled and configured to receive a signal indicative of ambient IR radiation level from IR receiver 40, and (after entering the learning mode) to cause LED 91 either to emit light continuously to indicate the presence of excessive ambient radiation or otherwise to cause LED 91 to emit the above-mentioned sequence of light pulses. During the learning mode, when the ambient radiation level is adequate for learning, LED 91 will cease emitting the distinctive sequence of light pulses and will instead begin to emit light continuously when the IR transmitter of a remote control device positioned very close to (e.g., not more than one foot away from) the controller's IR receiver transmits IR radiation to the controller's IR receiver. In response to the presence of excessive ambient radiation for learning mode operation, microprocessor 80 may be configured to refuse to arm a control key for learning;

The controller provides visual feedback indicative of strength of a configuring signal from the device (e.g., remote controller) to be emulated. In a typical implementation, microprocessor 80 is coupled and configured to receive IR receiver 40's output (produced in response to an IR configuring signal from a device to be emulated) and cause LED 91 to emit light with intensity (or duty cycle) indicative of the strength of the IR configuring signal. For example, before configuring any control key, the user can point an IR transmitter (of a device to be emulated) at receiver 40 and assert an IR signal from the transmitter. In response, microprocessor 80 may cause status LED 91 to emit light that is bright (and continuous) if the IR signal is strong and less bright (and/or intermittent) if the IR signal is weak. The user can rely on this feature of the controller to identify a location for the transmitter at which the transmitter will provide a sufficiently strong signal to successfully configure the controller;

The controller provides visual and audible feedback in response to selection of a specific control key to be configured. In a typical implementation, microprocessor 80 responds (during the learning mode) to selection of a specific control key to be configured by causing emission of a flash of light from an LED behind the key and causing a speaker (mounted on PCB 12) to produce a chirp or other sound;

The controller preferably also provides audible feedback at other times. For example, in a typical implementation of the learning mode, microprocessor 80 responds to successful learning of a code (by one control key) by causing a speaker (mounted on PCB 12) to produce a distinctive sound, and microprocessor 80 responds to unsuccessful learning of a code (by the control key) by causing the speaker to produce a different distinctive sound; and The controller is configured to learn multiple codes per control key during a phase of the learning mode (sometimes referred to as a "round robin" mode, "round robin" learning phase, or "round robin" procedure). In typical implementations, microprocessor 80 is configured via the round robin mode to emit a first control signal when a control key is actuated once during normal operation and to emit a different control signal the next time the key is actuated during normal operation, so that the configured controller can emulate a device that sends a sequence of different signals in response to repeated actuations of a single control key. Typically, the round robin mode is implemented as follows: the controller in the learning mode enters the round robin mode (in which N codes for one key are to be configured) in response to a sequence of N actuations of the key (with less than a predetermined minimum time interval between successive actuations). For keys in power and volume control sections of some embodiments (e.g., keys 22, 32, 34, and 84 of FIG. 7), N cannot exceed two. For keys in the source selection section of some embodiments (e.g., keys 26, 28, and 86 of FIG. 7), N cannot exceed 4. Typically then, microprocessor 80 causes a speaker (mounted on PCB 12) to produce a sequence of N beeps (or chirps) to confirm that the controller is ready for round-robin learning of N codes.

Then, for any value of N, microprocessor 80 causes an LED behind the selected key to emit a sequence of single flashes, and the user actuates the device (whose codes are to be learned) to assert the first code (to be learned) to the controller's IR receiver. The controller then emits three beeps (or chirps) in rapid succession to indicate successful learning of the code. Then, microprocessor 80 causes an LED behind the selected key to emit a sequence of double flashes and the user actuates the device (whose codes are to be learned) to assert the second code (to be learned) to the controller's IR receiver. The controller then emits three beeps (or chirps) in rapid succession to indicate successful learning of the code. If N=2, the controller then emits three beeps of a different type (e.g., louder or more emphatic beeps) to confirm that all codes have been learned successfully. The controller then automatically enters a test phase, and the key just configured blinks rapidly. In the test phase, each successive press of the key causes the controller to send the next code to the target (wrapping around to the first code in response to the next key actuation after the last code has been sent to the target). There typically is no ability to enter the macro mode for the key immediately (to configure the key immediately to send the sequence of codes in response to a single actuation of the key in the control mode). Rather, the macro mode for the key must typically be entered after the key has been configured in a round robin phase of the learning mode to send the sequence of codes in response to the sequence of key actuations. Macro mode testing procedures can be performed after the key has been configured in the macro mode. If N is greater than 2, after the second code has been learned, microprocessor 80 causes an LED behind the selected key to emit a sequence of triple flashes and the user actuates the device (whose codes are to be learned) to assert the third code (to be learned) to the controller's IR receiver. The controller then emits three beeps (or chirps) in rapid succession to indicate successful learning of the code. If N=3, the controller then emits three beeps of a different type (e.g., louder or more emphatic beeps) to confirm that all codes have been learned successfully, and the controller then automatically enters the described test phase.

If N=4, after the third code has been learned, microprocessor 80 causes an LED behind the selected key to emit a sequence of quadruple flashes and the user actuates the device (whose codes are to be learned) to assert the fourth code (to be learned) to the controller's IR receiver. The controller then emits three beeps (or chirps) in rapid succession to indicate successful learning of the code. The controller then emits three beeps of a different type (e.g., louder or more emphatic beeps) to confirm that all codes have been learned successfully, and the controller then automatically enters the described test phase.

During typical implementations of round-robin mode learning, if an error occurs during learning of any code in the sequence, the controller emits a characteristic sound (e.g., a single long error beep), and the round-robin mode learning process resets to the beginning. Any codes successfully learned before the failure are discarded if the controller resets in this fashion (as a result of a single failure), and the entire code sequence must be relearned from the beginning.

Figure 7A:
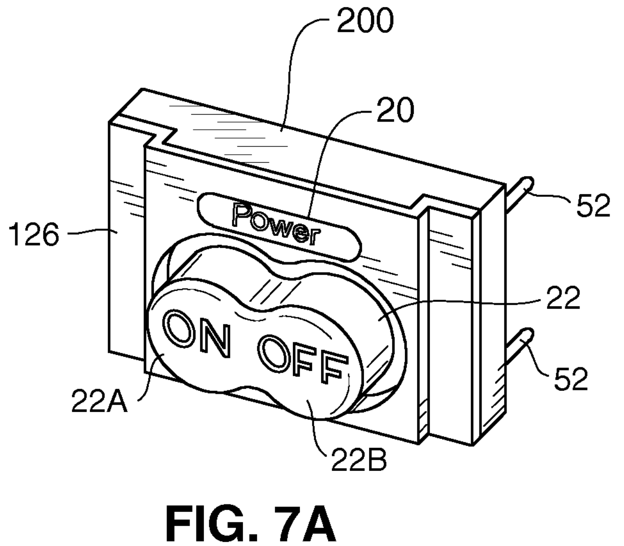
FIG. 7A is a perspective view of a modular control key insert, including insert body 126 and a window and control key element onto which the insert body is pressed.

In a class of preferred embodiments, illumination elements 104, 106, 107, 109, and 110 of PCB 12 are positioned so that each control key of each modular control key insert that can be mounted to the controller overlies at least one of the illumination elements. Each control key insert that can be removably mounted to a first region of the controller's surface (over a first region of PCB 12) can include any of a number of different sets of control keys. Preferably, different subsets of illumination elements 104, 106, 107, 109, and 110 are positioned to underlie the control keys of each such set of control keys, and the controller's circuitry is configured to respond to actuation of a control key (to be configured) during the learning mode by brightly (e.g., distinctly) illuminating only one or more of the illumination elements that are positioned under the control key; not any of the illumination elements that is not positioned under the control key. Such configuration of the circuitry allows the operation of configuring a control key during the learning mode to include at least one step of brightly illuminating a subset of the illumination elements that underlies the control key to provide visual feedback to the user, without distracting the user by brightly illuminating elements underlying other control keys. For example, if key 22 of FIG. 7A is mounted so that its left and right portions 22A and 22B overlie the leftmost and rightmost elements 104, the controller's circuitry can be configured in accordance with the invention to respond to actuation of portion 22A (to be configured) during the learning mode by brightly illuminating only the leftmost element 104 during configuring of portion 22A. Similarly, if key 84 of FIG. 7 is mounted over the middle one of elements 104, the controller's circuitry can be configured in accordance with the invention to respond to actuation of key 84 (to be configured) during the learning mode by brightly illuminating only the middle one of elements 104 during configuring of key 84.

In some embodiments, the controller of FIGS. 1-8 is configured to operate in a learning mode having a test phase in which a user can test a control key that has just been configured by pressing the key (without leaving the learning mode). Preferably, after a key is configured, microprocessor 80 automatically causes an LED behind the key to emit a visual signal (e.g., to blink rapidly) to prompt the user to test the key, the user then actuates the key to test it (i.e., to observe whether it performs its intended control function), and the user can then perform any desired learning mode operation (e.g., reconfigure the just-tested key, or configure another key) or terminate learning mode operation. While a key is being tested, the controller's IR emitter emits an IR control signal (e.g., a sequence of pulses) indicative of the just-learned code and preferably also a status indicator (e.g., status LED 91) emits visible light indicative of the IR control signal.

In some embodiments, a controller of FIGS. 1-8 is configured to operate in a macro mode in which the controller is configured to assert (in the control mode) a sequence of different control signals in response to a single actuation of a single control key. In some implementations, when two or more codes have been learned by one key (e.g., via a round robin learning mode), the user initiates operation in the macro mode after actuating (e.g., pressing) the key for more than a minimum time period (e.g., for at least M seconds). In response, microprocessor 80 is configured to cause the controller to send all the learned codes (from IR emitter 92A) in a sequence each time the user actuates the key once during the control mode (i.e., after exit from the macro mode and the learning mode).

In a typical implementation, the controller operates as follows in the macro mode. The controller enters the macro mode after a round robin learning mode in which the user configured microprocessor 80 to assert (in the control mode, after exit from the round robin learning mode) a sequence of N different control signals in response to a sequence of N actuations of a single control key (a "first" key), and after the user has tested the first key (during a test phase of the round robin learning mode) to verify that it has been configured properly, and after the user has actuated another control key to exit the test phase. To initiate the macro mode, the user presses the first key for at least five seconds. In response, the controller enters the macro mode in which microprocessor 80 is configured to sequentially assert (in the control mode) the N different control signals (e.g., with a 300 millisecond delay between assertion of each two successive control signals) in response to a single actuation of the first key, and microprocessor 80 causes a speaker (mounted on PCB 12) to produce distinctive audible feedback (e.g., a sequence of N beeps) to indicate that it has successfully performed this configuring operation. After microprocessor 80 has been so configured (in the macro mode), the user can continue to configure the controller (in the learning mode) or can cause the controller to exit the learning mode (e.g., if all keys have been configured).

Preferably, after microprocessor 80 has been configured (as a result of macro mode operation) to assert (in the control mode) a sequence of control signals in response to a single actuation of a specific key, the controller can be reconfigured by again entering the macro phase of the learning mode. For example, after the controller has been configured (as a result of macro mode operation as described in the previous paragraph) to assert (in the control mode) a sequence of control signals in response to a single actuation of a specific key, in response to the next entry into the macro phase of the learning mode (in response to the next actuation of the same key for more than the minimum time period as described), the controller is reconfigured to send the learned codes sequentially in response to a sequence of user actuations of the key during the control mode (i.e., to send one code per key actuation), so that the controller can effectively be toggled between two states by successive entries into the macro phase of the learning mode: a first state in which the controller sends all the learned codes in a sequence each time the user actuates the key once during the control mode; and a second state in which the controller sends one code per key actuation in the control mode (a sequence of individual ones of the learned codes in response to a sequence of key actuations during the control mode).

In a typical implementation of the controller of FIGS. 1-8, if any of the control keys are depressed while the user inserts a pin 393 (e.g., straightened paperclip) through aligned holes 193 and 293 to displace the actuator arm of limit switch 93, microprocessor 80 enables or disables emission of audio signals from the controller during operation in the control mode. For example, if control mode audible feedback has previously been enabled (so that the controller provides audible feedback during the control mode as well as during the learning mode), insertion of a pin 393 to displace the actuator arm of limit switch 93 causes microprocessor 80 to disable assertion of such audible feedback during the control mode (but not during the learning mode), and if control mode audible feedback has previously been disabled (so that the controller does not provide audible feedback during the control mode), insertion of a pin to displace the actuator arm of limit switch 93 causes microprocessor 80 to enable the audible feedback during the learning mode.

In a typical implementation, the controller of FIGS. 1-8 operates as follows in the learning mode. Each control key can be configured with either a single command (so that microprocessor 80 responds to each actuation of the key, in the control mode, by causing the controller to assert the command to a target device) or round robin commands (via a round robin learning mode). For example, a “POWER ON” key is typically configured with a single command so that its only function (in the control mode) is to turn on the controlled device (target). A key is configured with round robin commands if the key on the inventive controller must send multiple codes. For example, if a remote control device (to be emulated by the inventive controller) has N input selection keys, a single key of the inventive controller can be configured with N round robin commands so that the latter key (when configured) can be actuated N successive times to emulate in turn all of the input selection keys one at a time.

In the typical implementation, a control key of the controller of FIGS. 1-8 can be configured with a single code as follows. The controller is placed in the learning mode and the key is then pressed once to arm it. In response to this attempt to arm the key, if ambient radiation conditions are adequate for learning, the controller beeps once and an LED under the key slowly blinks to indicate that the key is armed for learning. However, in the presence of too much ambient radiation for learning, the controller emits light continuously from status LED 91, and responds to an attempt to arm a key by beeping once in a strident fashion. In this case, the key is not armed for learning (and therefore the LED does not blink or otherwise indicate that key is armed). In the presence of too much ambient radiation, the key cannot be successfully armed for learning. When the key is armed, the user points the IR transmitter (of the device to be emulated) at IR receiver 40 (shown in FIGS. 1 and 2) and presses and holds the relevant key (of the device to be emulated) for at least one second. While the IR signal is being received at receiver 40, status LED 40 flickers to indicate that the code is being received. The inventive controller then beeps three times quickly to indicate successful learning of the code, and an LED under the key begins flashing intermittently (and quickly) to indicate that the controller has entered a test phase (sometimes referred to as a “verification” phase) of the learning mode. In the test phase, the key can be tested (e.g., as in the example described above). If no IR code is received at receiver 40 within a predetermined time after a key has been armed, the key reverts to an unarmed state. A different control key can be selected for configuration at any time, including a key that has already been configured. If the user presses a key that has been armed for learning, the key reverts to an unarmed state.

In the typical implementation, a control key of the controller of FIGS. 1-8 can be configured as follows with multiple codes in a round robin mode. To arm a control key (of the controller in the learning mode) for round robin learning in which N codes for the key are to be learned, the key is pressed N times within a predetermined time. In response, if ambient radiation conditions are adequate for learning, the controller beeps N times (once for each code it expects to learn). However, in the presence of too much ambient radiation for learning, the controller emits light continuously from status LED 91, and responds to an attempt to arm a key for round robin learning by beeping once in a strident fashion. In the presence of too much ambient radiation, the key cannot be successfully armed for round robin learning. When the key has been successfully armed, an LED under the key will flash once regularly to indicate that the key is ready to learn the first code by flashing once. The first code is then taught in the above-described way that the key is taught a single code. If the key is successfully taught an Mth code (where $M<N$), microprocessor 80 causes a speaker (mounted on PCB 12) to produce a sequence of three beeps, with a specific short time period between successive beeps) and the LED under the key then begins regularly flashing M+1 times, then (after a brief pause) flashes M+1 times again, and so on, to indicate that the key is ready to learn the (M+1)th code. The (M+1)th code is then taught in the above-described way that the key is taught a single code. Upon successful learning of the last of N codes for the key, microprocessor 80 again causes the speaker to produce a sequence of three beeps (with the same time period between successive beeps) to indicate that the Nth code has been learned, and then subsequently to produce a second sequence of three (more emphatic) beeps (with a longer time period between successive beeps) to indicate that the key has been fully configured, and an LED under the key begins flashing intermittently (and quickly) to indicate that the controller has entered a test phase of the learning mode. In the test phase, the key can be tested (e.g., as in the example described above). If no IR code is received at receiver 40 within a predetermined time after a key has been armed (or since it was taught the Mth of N codes, where M<N), the key reverts to an unarmed state. If the user presses a key that has been armed for round robin learning, the key reverts to an unarmed state.

The controller of FIGS. 1-8 can be cloned using IR emitter 42 and IR receiver 40 (shown in FIGS. 1 and 2). IR emitter 42 and IR receiver 40 are used to implement a cloning mode in which the controller operates as a "clone" (so as to become configured to emulate another device, sometimes referred to as a "donor," in a rapid fashion). With IR emitter 42 and IR receiver 40 positioned as shown in FIG. 1 (and FIG. 2), the IR emitter (42) of a first controller aligns with the IR receiver (40) of an identical controller when the two controllers are positioned face to face (e.g., when the first controller is wall-mounted and operating as a donor, and the other controller (to operate in a cloning mode, or already operating, as a clone) is placed face to face with the first controller. In typical implementations, while a controller is in its learning mode, a user causes the controller to enter the cloning mode by holding down any control key while removing pin 393 from aligned holes 193 and 293 to allow limit switch 93 to relax into its default state. So, a user may also cause an unconfigured controller to enter the cloning mode (without first entering the learning mode), the controller is preferably configured so that the act of pressing any control key of the controller while power is applied to the controller causes the controller to enter the cloning mode. Upon entering the cloning mode (regardless of the manner in which this has occurred), a controller emits IR radiation from its emitter 42. A microprocessor 80 of another controller (e.g., a previously configured controller) which can operate as the donor monitors the signal output by its receiver 40 to determine whether another controller (operating as a clone during the cloning mode) is transmitting IR radiation to receiver 40. When the donor determines that an IR transmitter of a clone is aligned with the donor's receiver 40, the donor emits a signal from its IR transmitter to indicate to the clone that it (the donor) is available for cloning. In response, the clone executes a complete cloning operation (in which the clone retrieves and duplicates in itself the configuration of the donor) with visual feedback to the user to indicate the cloning operation is ongoing.

In alternative embodiments, the controller has two IR receivers (one for use in a learning mode; the other for use in a cloning mode). Preferably, however, the same IR receiver (e.g., receiver 40 of the controller of FIGS. 1-8) is used in both the learning mode and cloning mode. Also preferably, the inventive controller is configured so that no master device (a third device other than the donor and clone) is needed to implement either learning or cloning.

We next provide additional details of a cloning operation performed by typical implementations of two identical aligned controllers of the type shown in (and described with reference to) FIGS. 1-8. Both controllers can but need not have identical control key inserts installed. Both the clone and donor must be powered during the cloning operation. The donor will typically be installed (wall-mounted) during the cloning operation and thus can be powered normally, but the clone will typically not be installed (and may need to be powered by temporarily wiring it to the donor's power supply or to a battery). Preferably, each controller emits a sequence of chirping sounds (or other audible feedback) during a cloning operation. In the cloning mode, the clone emits IR radiation from its emitter 42. Microprocessor 80 of the donor monitors the signal output by its receiver 40 to determine whether another controller (operating as a clone) is transmitting IR radiation to its receiver 40. When the donor determines that an IR transmitter of a clone is transmitting IR radiation to the donor's receiver 40, the donor emits a signal from its IR transmitter to indicate to the clone that it (the donor) is available for cloning. In response, the clone executes a complete cloning operation in which the clone retrieves and duplicates in itself the configuration of the donor, and in which the donor operates passively (in the sense that it responds to requests for data from the clone but does not initiate transfer of data itself) except in that the donor temporarily enters a special state (in response to each request from the clone for data) in which the donor dedicates its attention to communicating with the clone and signals operation in this state by illuminating its status LED 91 in a characteristic manner and emitting chirps (or other sounds) from its loudspeaker when providing data to the clone. If the alignment of the donor and clone is disrupted while the donor is in this state, the donor ceases to chirp. If this occurs and the two controllers are realigned within a predetermined time (e.g., 15 seconds), they will resume cloning operation at the stage at which alignment was disrupted. If alignment is disrupted (and thus communication is broken) for more than the predetermined time, the clone will "time out" and cease the cloning operation and will need to restart the cloning operation in order to perform a completed cloning operation. The donor returns to its control mode after waiting for a predetermined time (e.g., 15 seconds) after transmitting requested data to the clone during the cloning operation, regardless of whether the clone has performed a completed cloning operation.

Typically, when the clone has completed copying all configuration data received from the donor, the clone preferably emits a sequence of sounds (e.g., three beeps) and resets itself into its control mode (preferably, the LEDs underlying the clone's control keys flicker in quick succession during the resetting). After the clone has reset itself, it will be fully operational and function in all respects identically to the donor unit, including but not limited to behaving as if had itself through a normal learning mode learned all of the codes previously configured into the donor. The donor returns to its control mode after waiting for a predetermined time (e.g., 15 seconds) after transmitting requested data to the clone during the cloning operation.

In typical implementations of cloning in accordance with the invention, a controller does not need to have been previously configured in order to be operable as donor. A controller that has never been configured typically may operate as donor to another. If it does, the cloning operation will result in erasure of any configuration bits that the clone may previously have had stored in its memory.

In typical embodiments, a controller on which no key inserts have been installed may operate as a donor or a clone. Typically, one controller may donate to or clone from another that is configured with a different set of keys inserts. However the newly cloned unit will not emulate the donor until key inserts that match those of the donor are mounted thereon (or, until the newly cloned unit is at least partially reconfigured for use with the key inserts mounted thereon, where the latter key inserts do not match those of the donor).

In a typical cloning operation, a first controller ("Unit A") that will operate as a donor is assumed to preconfigured and powered (commonly it will be installed already in a wall). The front plate of Unit A must be removed so that its IR eye and local IR output are exposed. A second controller ("Unit B") that will operate as a clone is powered. At least one key insert must be attached to Unit B because a key will be pressed as described below. Typically, a paperclip is employed to move Unit B's limit switch so as to place Unit B in its learning mode. While any key of Unit B is held down on, the paperclip is then removed. When the clip is removed, Unit B enters cloning mode. Alternatively, a Unit B that contains no configuration on its EEPROM (e.g. a newly manufactured unit or one that has been erased or which cloned an unconfigured unit) may also be placed in receptive cloning mode by simply holding down any key while applying power to the unit. When Unit B enters the cloning mode it begins simultaneously transmitting and listening for IR communication. Until Unit B finds another controller that is available as a donor, Unit B "pings" (i.e., sends out a characteristic query, and makes a characteristic user display (and chirps loudly). When Unit B is placed face-to-face with Unit A, Unit A receives the control "ping" and replies. Unit B then initiates and controls a cloning operation in which data are transferred to Unit B (via modulated IR radiation) from Unit A. Through the entire transfer, Unit A is passive in the sense that it only receives requests (for data) and fulfills them. Unit A never initiates any communications on its own. However, Unit A does enter temporarily a special state in which it dedicates its attention to communicating with Unit B (and Unit A signals this by a characteristic user display and by emitting chirps when providing data to Unit B). When Unit B has retrieved all configuration data from Unit A, it resets itself and is said to be a "clone" of unit A. When Unit B ceases transmitting, Unit A waits a moment and returns to normal operation.

Optionally, the inventive controller is configured to illuminate each of its control keys that has been configured and is thus available for use. Such illumination allows the user to determine at a glance which control keys have not been configured and are thus not available for use. For example, when microprocessor 80 (of the controller of FIGS. 1-8) has been configured to respond to actuation of one or more of switches 60, 61, 62, 63, 64, and 65, microprocessor 80 illuminates at least one (but typically not all) of LEDs (light-emitting diodes) 104. When a transparent or translucent control key (e.g., key 22 or 84) is positioned over the illuminated LEDs 104, a user perceives the key to be illuminated. Similarly, microprocessor 80 illuminates at least one (but typically not all) of LEDs 106 when microprocessor 80 has been configured to respond to actuation of corresponding ones of switches 66, 67, 68, and 69 (typically microprocessor 80 is configured to respond to switches 68 and 69 when insert body 58 is used, or to respond to switches 66, 67, 70, and 71 when insert body 8 is used), microprocessor 80 illuminates LED 107 when microprocessor 80 has been configured to respond to actuation of corresponding switches 70 and 71, microprocessor 80 illuminates LED 109 when microprocessor 80 has been configured to respond to actuation of corresponding switches 72, 73, and 75, and microprocessor 80 illuminates LED 110 when microprocessor 80 has been configured to respond to actuation of corresponding switches 74, 76, and 77. Control keys 22, 26, 28, 84, and 86 (which fit over LEDs 104, 106, and 107) and control keys 32 and 34 (which fit over LEDs 109 and 110) should thus be transparent or translucent (except for function indications marked thereon) so that light from the LEDs can propagate through them to the user.

In a class of embodiments, the inventive controller can easily be disassembled and reassembled in a different configuration (i.e., with a different set of control key inserts). For example, the controller of FIGS. 1-8 is assembled by reversibly snapping together elements 2, 4, 12, and 14 (and control key inserts properly positioned between elements 2 and 4), without the need for screws. The controller of FIGS. 1-8 can be disassembled by squeezing together pairs of prongs 4A (of bezel 4) and then removing prongs 4A from aligned holes 94, 304, and 204 of elements 2, 12, and 14, to decouple elements 2, 4, 12, and 14. After disassembly, a different set of control key inserts can be swapped for the previous control key inserts, and the controller then reassembled with the new set of control key inserts. After the controller is reassembled with a new set of control key inserts, microprocessor 80 and EEPROM 82 typically need to be reconfigured.

Preferably, the modular control key inserts of the inventive controller are available in a variety of colors so that a user can mount inserts that not only accommodate a desired set of control keys but also have desired colors. Also preferably, interchangeable PCBs for use in the inventive controller are available with differently colored LEDs (e.g., to match or complement colors of control key inserts).

In a class of embodiments, each control key insert and each window and control key thereof has structure of a type to be described with reference to FIG. 7A. FIG. 7A is a perspective view of a modular control key insert that can be removably mounted to the controller of FIGS. 1-8 in place of the insert having body 6 or the insert having body 56 (as shown in FIGS. 6 and 7). The FIG. 7A insert has insert body 126 (identical to insert body 6 of FIGS. 6 and 7) made of hard plastic, and window and control key element 200 which is made of flexible material and snapped onto the back side of insert body 126. Element 200 is molded from flexible plastic (or other flexible material). Element 200 has a window portion 20 that protrudes into and fills a slot extending through body 126, such that its forward face (i.e. that facing the user) is flush (or nearly flush) with the surface of body 126, and a key portion 22 that protrudes through another slot extending through body 126. The four alignment posts 52 of insert body 126 (two of which have ends that are visible in FIG. 7A) are identical to posts 52 of insert body 6 (or 56) of FIG. 6, and extend through four corresponding holes (not visible in FIG. 7A) through element 200. Two small, hard switch contacts are attached to the back face of key portion 22 behind left end 22A (labeled "ON") in positions for contacting switches 60 and 63 (shown in FIG. 2) when the FIG. 7A insert is mounted to a fully assembled version of the controller. Similarly, two small, hard switch contacts are attached to the back face of key portion 22 behind right end 22B (labeled "OFF") in positions for contacting switches 62 and 65 (shown in FIG. 2) when the FIG. 7A insert is mounted to a fully assembled version of the controller. Although key portion 22 of FIG. 7A is a single element, it functions as two independent keys (one overlying switches 60 and 63 and operable to actuate one or both of switches 60 and 63; the other overlying switches 62 and 65 and operable to actuate one or both of switches 62 and 65).

Body 126 is preferably made of hard material comprising a front layer that is either transparent (to all visible wavelengths) or tinted (transmissive to some but not all visible wavelengths and having a desired color), and a back layer of paint (or other occludant material) giving body 126 a desired aesthetic appearance. Element 200 is a translucent, one-piece element (typically formed by molding) through which light can propagate from one or more of LEDs 83 and 104 to backlight labeled portions 20 and 22 thereof. Window portion 20 is labeled to indicate the type of control operation (e.g., "power" control operations) that the switches underlying key portions 22A and 22B can be configured to perform, and each of key portions 22A and 2B is labeled to indicate the specific control operation (e.g., "power on" or "power off") that the underlying switch can be configured to perform.

In variations on the specific structure shown in FIG. 7A, body 126 has differently shaped holes for receiving differently shaped window and control key portions of element 200, and/or element 200 has less (or more) than two control key portions.

In some embodiments, the invention is a wall-mountable, configurable controller having N control keys (where N is an integer in the range $2 \leqq N \leqq 6$) and a surface, wherein the surface has a first region including a first key set (including at least one control key), a second region (distinct from the first region) including a second key set (including at least one control key), and a third region (distinct from each of the first region and the second region) including a third key set (including no control key, or at least one control key). A first configurable switch set (including at least one configurable switch) is positioned relative to the first key set and configured such that at least one switch in the first configurable switch set is actuated by pressing each control key in the first key set (e.g., the first configurable switch set underlies the first control key set), a second configurable switch set (including at least one configurable switch) is positioned relative to the second key set and configured such that at least one switch in the second configurable switch set is actuated by pressing each control key in the second key set (e.g., the second configurable switch set underlies the second control key set), and a third configurable switch set (including at least one configurable switch) is positioned relative to the third key set and configured such that at least one switch in the third configurable switch set is actuated by pressing each control key in the third key set (e.g., the third configurable switch set underlies the third key set). Each switch in the first configurable switch set is dedicated to control operations of a first type (e.g., power control operations) in the sense that the controller is configured to perform operations (e.g., to trigger execution of operations) of the first type in response to actuation of any number of switches of the first configurable switch set (and preferably the switches of the first configurable switch set can be configured to perform any of at least two different operations of the first type), each switch in the second configurable switch set is dedicated to control operations of a second type (e.g., source selection operations) in the sense that the controller is configured to perform operations (e.g., to trigger execution of operations) of the second type in response to actuation of any number of switches of the second configurable switch set (and preferably the switches of the second configurable switch set can be configured to perform any of at least two different operations of the second type), and each switch in the third configurable switch set is dedicated to control operations of a third type (e.g., volume control operations) in the sense that the controller is configured to perform operations (e.g., to trigger execution of operations) of the third type in response to actuation of any number of switches of the third configurable switch set (and preferably the switches of the third configurable switch set can be configured to perform any of at least two different operations of the third type). In some preferred embodiments, the second region is between the first and third regions. Preferably, each key of the first key set is labeled to indicate that said key can be actuated to trigger execution of a control operation of the first type, each key of the second key set is labeled to indicate that said key can be actuated to trigger execution of a control operation of the second type, and each key of the third key set is labeled to indicate that said key can be actuated to trigger execution of a control operation of the third type. Preferably, the controller is modular (in the sense that it can be used with interchangeable, removably mountable control key inserts), each insert having a key for triggering execution of a control operation of the first type is configured to be removably mounted to the first region of the controller's surface but preferably is configured not to be mountable to the second region or the third region, each insert having a key for triggering execution of a control operation of the second type is configured to be removably mounted to the second region of the surface but preferably is configured not to be mountable to the first region or the third region, and each insert having a key for triggering execution of a control operation of the third type is configured to be removably mounted to the third region of the surface but preferably is configured not to be mountable to the first region or the second region.

In some embodiments, the inventive controller has configurable circuitry (including switches and typically also a microprocessor), an infrared ("IR") receiver coupled to the circuitry and configured to assert configuring bits to the circuitry in response to IR radiation (e.g., modulated IR radiation). In response to the configuring bits, the circuitry is configured to respond in a desired way to actuation of specific ones of the switches. Preferably, the controller also includes an IR emitter output from which target control signals (e.g., for use in generating modulated IR target control radiation) can be asserted to the target (the projector or other device to be controlled) in response to control bits asserted to the IR emitter output by the circuitry. Typically, the target operates in response to target control radiation. Typically the target control signals propagate from the IR emitter output to an IR emitter (positioned near the target) via a wire pair (or a cable including an optical fiber or bundle of optical fibers), and modulated target control IR radiation generated in the IR emitter in response to the target control signal is transmitted from the IR emitter to the target. In some embodiments including such an IR receiver and IR emitter output, the controller also includes an IR transmitter coupled to the circuitry and configured to transmit IR configuring radiation (e.g., IR radiation modulated with configuring bits for configuring another controller) in response to configuring bits received from the circuitry. A controller (a "first" controller) including such an IR transmitter is preferably operable as a donor to clone another controller operating as a clone in a cloning mode. In the cloning mode, the first controller can transmit data bits to the clone (a second controller, which can be identical to the first controller) to configure the second controller to emulate the first controller.

In typical embodiments, the inventive controller is configured to control a projector (or another audiovisual display device), and can be configured to do so in any of a number of different ways.

Another aspect of the invention is a control key insert that is removably mountable as an element of a modular controller. For example, the insert can include a body having a first set of alignment posts that are distinctively shaped and positioned for insertion in corresponding set of holes in a first region of a plate of the controller. Such an insert can be swapped for another whose body has an identical set of alignment posts. Preferably, a second region of the plate (distinct from the first region) has a second set of holes for receiving a second set of alignment posts (differently shaped and/or positioned relative to each other than the first set of alignment posts), so that an insert of a different type (having posts identical to the second set of alignment posts) can be removably mounted to the second region of the plate with its alignment posts in the second set of holes. Preferably, a third region of the plate (distinct from each of the first and second regions) has a third set of holes for receiving a third set of alignment posts (differently shaped and/or positioned relative to each other than each of the first and second sets of alignment posts), so that an insert of a different type (having posts identical to the third set of alignment posts) can be removably mounted to the third region of the plate with its alignment posts in the third set of holes. Preferably, three (or two or four) of the inventive inserts (each preferably having a different, distinctive set of alignment posts) are sized and shaped to be aligned by a bezel, and the bezel is configured to be removably mounted to an embodiment of the inventive controller to retain the inserts in proper positions relative to the controller's switches (with the alignment posts received in holes of a plate of the controller).

In another class of embodiments, the inventive controller is a modular, wall-mountable, configurable controller to which at least one of the inventive control key inserts is removably mounted. Such a controller is modular in the sense that it can be used with any of a set of interchangeable, removably mountable control key inserts. For example, one insert including a single power control key (which can be depressed once to change the target's power state, either from "power on" to "power off" or from "power off" to "power on") can be swapped for another insert including two separate power control keys (one which can be depressed to change the target's power state from "on" to "off;" and another which can be depressed to change the target's power state from "off" to "on"). The controller will typically need to be reconfigured each time one control key insert is swapped for another.

In some embodiments, the invention is a wall-mountable, configurable projector controller having N control keys, where $2 \leqq N \leqq 6$. The controller has a first key set, a second key set, and optionally a third key set. The key sets are in distinct regions of the controller's surface. The first key set includes one or two keys, each labeled to indicate that is can be actuated to perform (e.g., to trigger execution of) a projector power control operation. The second key set includes one or two keys, each labeled to indicate that it can be actuated to perform (e.g., to trigger execution of) a source selection operation. When present, the third key set includes one or two keys, each labeled to indicate that it can be actuated to perform a projector volume control operation. The controller also has configurable circuitry, including switches that are actuatable in response to actuation of keys of each key set. The circuitry is configured to perform a projector power control operation in response to each actuation of a key of the first key set, to perform a source selection operation in response each actuation of a key of the second key set, and (if the third key set is present) to perform a projector volume control operation in response to each actuation of a key of the third key set. The circuitry is not (and is not configured to be) configured to perform a source selection or projector volume control operation in response to actuation of any key of the first key set, is not (and is not configured to be) configured to perform a projector power or projector volume control operation in response to actuation of any key of the second key set, and is not (and is not configured to be) configured to perform a projector power or source selection operation in response to actuation of any key of the third key set. Preferably, the controller is modular in the sense that it can be used with interchangeable, removably mountable control key inserts. Each insert having a key for triggering execution of a projector power control operation is configured (i.e., sized and shaped) to be removably mounted to a first region of the controller's surface but not to be mountable to a second region (distinct from the first region) of the surface, and each insert having a key for triggering execution of a source selection operation is configured to be removably mounted to the second region of the surface but not to be mountable to the first region of the surface, and each insert having no keys or a key for triggering execution of a projector volume operation is configured to be removably mounted to the third region of the surface but not to be mountable to each of the first and second regions of the surface. Each insert having a key for triggering execution of a control operation of one type can be swapped for an insert having a different key (or keys) for triggering execution of a control operation of the same type. For example, an insert including a single power control key (which, when mounted can be depressed once to change a projector's power state, either from "power on" to "power off" or from "power off" to "power on") can be swapped for another insert including two separate power control keys (one which, when mounted can be depressed to change the projector's power state from "on" to "off;" and another which, when mounted can be depressed to change the projector's power state from "off" to "on"). The controller will typically need to be reconfigured each time one control key insert is swapped for another.

In alternative embodiments, the inventive controller is configured to operate in a macro mode and/or a round-robin mode that is (are) more sophisticated than those specifically described above. For example, the interface for learning round-robin and macro code sequences may be extended to allow user configurable grouping of commands in a way that combines current round-robin and macro features, e.g. so that when a control key has been configured to execute a sequence of commands A, B, C, and D in response to four successive actuations (during the control mode) of the key, the controller can be conveniently taught to execute commands "A then B" in response to one actuation (during the control mode) of the key and then commands "C then D" in response to the next actuation (during the control mode) of the key. In some such embodiments, delay time between command executions may also be configurable.

It should be understood that while some embodiments of the present invention are illustrated and described herein, the invention is defined by the claims and is not to be limited to the specific embodiments described and shown.

What is claimed is:

1. A control key insert removably mountable to a wall-mountable subassembly of a configurable controller for use as an element of the controller, said wall-mountable subassembly defining alignment holes, and said control key insert including:

a body defining alignment posts configured to fit in a subset of the alignment holes when the control key insert is mounted to the wall-mountable subassembly, wherein the body also defines at least two slots that extend through said body; and a key element snap-fitted to the body, wherein the key element comprises flexible, translucent material having a translucent window portion and at least one translucent control key portion, the window portion protrudes into a first one of the slots, and each said control key portion protrudes through a different one of the slots and has a front surface and a back surface, said back surface having freedom to translate relative to the body in response to exertion of pushing force on the front surface.

2. The control key insert of claim 1, also including a layer of occludant material on a surface of the body.

* * * * *